US012783372B2

(12) United States Patent
Saito et al.

(10) Patent No.: US 12,783,372 B2
(45) Date of Patent: Nov. 3, 2026

(54) SIGNAL PROCESSING RESOURCE SWITCHING DEVICE, SIGNAL PROCESSING RESOURCE SWITCHING SYSTEM, SIGNAL PROCESSING RESOURCE SWITCHING METHOD AND PROGRAM

(71) Applicant: NTT, Inc., Tokyo (JP)

(72) Inventors: Shogo Saito, Musashino (JP); Kei Fujimoto, Musashino (JP); Ikuo Otani, Musashino (JP); Ko Natori, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/881,782

(22) PCT Filed: Jul. 11, 2022

(86) PCT No.: PCT/JP2022/027324

§ 371 (c)(1),
(2) Date: Jan. 7, 2025

(87) PCT Pub. No.: WO2024/013828

PCT Pub. Date: Jan. 18, 2024

(65) Prior Publication Data

US 2026/0010445 A1 Jan. 8, 2026

(51) Int. Cl.
*G06F 11/20* (2006.01)
*G06F 9/48* (2006.01)

(52) U.S. Cl.
CPC .......... *G06F 11/2041* (2013.01); *G06F 9/485* (2013.01); *G06F 11/2028* (2013.01); *G06F 11/203* (2013.01)

(58) Field of Classification Search
CPC .. G06F 11/2041; G06F 9/485; G06F 11/2028; G06F 11/203
See application file for complete search history.

(56) References Cited

U.S. PATENT DOCUMENTS

| | | | | |
|---|---|---|---|---|
| 11,119,803 | B2 * | 9/2021 | Krasner ................ | G06F 9/5027 |
| 2019/0384737 | A1 | 12/2019 | Schardt et al. | |

(Continued)

FOREIGN PATENT DOCUMENTS

| | | | |
|---|---|---|---|
| JP | 689272 | A | 3/1994 |
| JP | 2018045415 | A | 3/2018 |

OTHER PUBLICATIONS

Kaneko et al., "Power-aware dynamic placement control technology to maximize power efficiency in optically disaggregated computers," NTT Journal, May 2021, 54-57, 8 pages (with machine translation).

(Continued)

*Primary Examiner* — Philip Guyton
*Assistant Examiner* — Xinyuan Yu
(74) *Attorney, Agent, or Firm* — Fish & Richardson P.C.

(57) ABSTRACT

A signal processing resource switching device includes a function proxy execution unit configured to accept a "function name•argument" from an application unit and notify the application of argument data of a function when the function is executed or ended by a calculation resource, an accelerator failure detection unit configured to detect a failure of an accelerator, and an offload destination calculation resource determination unit configured to determine an unfailed and available resource among the calculation resources, and the function proxy execution unit performs offloading on the resource determined by the offload destination calculation resource determination unit.

5 Claims, 19 Drawing Sheets

(56) References Cited

U.S. PATENT DOCUMENTS

| | | | | |
|---|---|---|---|---|
| 2020/0133531 | A1 * | 4/2020 | Subramaniam | G06F 9/5027 |
| 2022/0094590 | A1 * | 3/2022 | Lal | H04L 41/0668 |
| 2022/0114055 | A1 * | 4/2022 | Doshi | G06F 11/1492 |

OTHER PUBLICATIONS

Openstack-ja.github.io [online], “Chapter 12 Maintenance, Breakdowns and Debugging,” available on or before Oct. 2014, retrieved on Mar. 2022, retrieved from URL<openstack-ja.github.io/openstack-manuals/openstack-ops/content/maintenance.htmll>, 38 pages (with machine translation).

Chowdhury et al., “A Fault-Tolerant Approach to Alleviate Failures in Offloading Systems,” Wireless Personal Communications, Sep. 2019, 110:1033-1055.

* cited by examiner

Fig. 7

| LOADED HOST INFORMATION | ACCELERATOR IDENTIFIER | ACC PERFORMANCE (THROUGHPUT) | STATE |
|---|---|---|---|
| Host-1(192.168.0.1) | FPGA-1 | 10.0Gbps | AVAILABLE |
| Host-1(192.168.0.1) | FPGA-2 | 5.0Gbps | AVAILABLE |
| Host-2(192.168.0.2) | CPU-1 | 2.0Gbps | ALLOCATED |
| Host-3(192.168.0.3) | ASIC-1 | 10.0Gbps | IN FAILURE |

SIGNAL PROCESSING RESOURCE SWITCHING DEVICE, SIGNAL PROCESSING RESOURCE SWITCHING SYSTEM, SIGNAL PROCESSING RESOURCE SWITCHING METHOD AND PROGRAM

CROSS-REFERENCE TO RELATED APPLICATIONS

This is a National Stage Application of PCT Application No. PCT/JP2022/027324, filed on Jul. 11, 2022. The disclosure of the prior application is considered part of the disclosure of this application, and is incorporated in its entirety into this application.

BACKGROUND

Technical Field

The present invention relates to a signal processing resource switching device, a signal processing resource switching system, a signal processing resource switching method and a program.

Background Art

Different types of processors have different workloads that they are good at (high processing capacity). In contrast to a highly versatile central processing unit (CPU), there is an accelerator (hereinafter appropriately referred to as ACC) capable of computing highly parallel workloads that a CPU is weak at (low processing capacity) at a high speed and with high efficiency, such as a field programmable gate array (FPGA)/(in the following description, "/" denotes "or") graphics processing unit (GPU)/application specific integrated circuit (ASIC). By combining these different types of processors and off-loading the workload as a weak point of the CPU to the ACC for computation, an offload technique is being utilized to improve overall computation time and computation efficiency.

In a case where the performance of the CPU alone is insufficient to meet the requirements in a virtual radio access network (vRAN) or the like, some processing is offloaded to an accelerator capable of high-speed arithmetic operation such as an FPGA or a GPU.

Typical examples of specific workloads on which ACC offloading is performed include encoding/decoding processing (a forward error correction (FEC) process) in a vRAN, audio and video media processing, encryption/decryption processing, and the like.

In a computer system, in some cases, a computer (hereinafter referred to as a server) is equipped with hardware (CPU) coping with general-purpose processing and hardware (an accelerator) specialized in specific arithmetic operations, and some arithmetic processing is offloaded from a general-purpose processor running software to an accelerator.

In addition, with the development of cloud computing, it is becoming common to simplify the configuration of a client machine by offloading some processing with a large amount of arithmetic operation from a client machine located at a user site to a server at a remote site (such as a data center located near a user) through a network (hereinafter referred to as an NW).

FIG. 15 is a diagram illustrating a computer system.

As shown in FIG. 15, a server 50 has a CPU 11 and an accelerator 12-1 mounted on hardware 10, and includes an application (hereinafter referred to as an APL or an application unit as appropriate) 1 of software 20 operating on the CPU 11 on the server 50.

The accelerator 12 is a calculation accelerator device such as a field programmable gate array (FPGA)/graphics processing unit (GPU).

The accelerator 12 has a certain probability of a failure such as a cooling fan failure.

The application 1 calls a function group (API) specified as a standard, and offloads some processing to the accelerator 12.

In FIG. 15, the accelerator 12 may fail by itself, and it is necessary to continue the calculation at this time.

The computer system is required to maintain the availability of the application 1 even during a period in which the accelerator 12 mounted in the server 50 cannot be used due to a failure, maintenance, or the like. The requirements for the availability of the application 1 are as follow.

Requirement 1: Permeability

There is no need to modify an application or install dedicated processing. Specifically, there is no need for processing of detection and avoidance in the application when a specific accelerator becomes unavailable.

Requirement 2: Availability in the Event of Sudden Failure

The time required for an application to restart arithmetic processing when a specific accelerator suddenly becomes unavailable is minimized.

Requirement 3: Continuation of Arithmetic Operation During Intentional Disconnection Arithmetic processing is not interrupted during disconnection (switching) of the accelerator 12 planned in advance such as during maintenance or failure prediction (no interruption).

RELATED ART

Non Patent Literature

[NPL 1] "Open Stack Guide", [online], [accessed on Jun. 6, 2022], the Internet <URL: http://openstack-ja.github.io/openstack-manuals/openstack-ops/content/maintenance.html>

SUMMARY OF INVENTION

Technical Problem

There is an existing technique of, after detecting a failure of hardware, migrating an application or a virtual machine (VM) (hereinafter referred to as an application/VM) using the hardware to the same server (pattern 1) or to another server (pattern 2) to continue processing (see NPL 1).

FIGS. 16 and 17 are diagrams illustrating the technique of NPL 1. FIG. 16 is a diagram illustrating pattern 1: relaunching an application/VM within the same server, and FIG. 17 is a diagram illustrating pattern 2: launching on a separate server. The same components as those in FIG. 15 are denoted by the same reference numerals and signs. Meanwhile, in FIGS. 16 and 17, inoperative devices are indicated by broken lines.

As shown in FIG. 16, in a case where a failure has occurred in the accelerator 12-1 within the same server 50 (reference sign a in FIG. 16), for example, an operator detects a failure of hardware (reference sign b in FIG. 16), and then the application/VM within the same server is re-launched on the basis of instructions from the operator (reference sign c in FIG. 16). A re-launched application/VM 1-2 re-offloads a task to an accelerator (redundant) 12-2 (reference sign d in FIG. 16).

As shown in FIG. 17, in the case of launching on a separate server, for example, an operator performs migration on an application and a virtual machine in a separate server 60 (reference sign c in FIG. 17). The re-launched application/VM 1-2 re-offloads a task to the accelerator (redundant) 12-2 (reference sign d in FIG. 17).

However, in both of the above pattern 1: re-launching an application/VM within the same server and pattern 2: launching on a separate server, the entire application/VM is migrated or restarted up even though the CPU 11 has not failed, and there are the following three gaps.

(1) Gap 1

Re-offload processing from an application is required during failure recovery (reference sign d in FIGS. 16 and 17), and <Requirement 1: Permeability> is not satisfied.

(2) Gap 2

In the event of a sudden failure, an arithmetic operation stops during application re-launching or migration processing (reference sign c in FIGS. 16 and 17), and <Requirement 2: Availability in the event of sudden failure> is not satisfied.

(3) Gap 3

Even in the case of switching planned in advance, an arithmetic operation stops during the migration of an application (reference sign c in FIGS. 16 and 17) and re-offload processing (reference sign d in FIGS. 16 and 17), and <Requirement 3: Continuation of arithmetic operation during intentional disconnection> is not satisfied.

The present invention was contrived in view of this background, and an object of the present invention is to continue arithmetic processing to the maximum extent possible without instructions from an application when an accelerator becomes unavailable.

Solution to Problem

In order to solve the above problems, according to the present invention, there is provided a signal processing resource switching device having a plurality of accelerators and switching a calculation resource which is an offload destination when specific processing of an application is offloaded to the accelerators to perform arithmetic processing, the device including: a function proxy execution unit configured to accept a function name and argument from an application and notify the application of argument data of a function when the function is executed and ended by the calculation resource; an accelerator failure detection unit configured to detect a failure of the accelerator; and an offload destination calculation resource determination unit configured to determine an unfailed and available resource among the calculation resources, wherein the function proxy execution unit performs offloading on the resource determined by the offload destination calculation resource determination unit.

Advantageous Effects of Invention

According to the present invention, it is possible to continue arithmetic processing to the maximum extent possible without instructions from the application when the accelerator is unavailable.

BRIEF DESCRIPTION OF DRAWINGS

FIG. 7 is a diagram illustrating an accelerator management table of an offload destination calculation resource determination unit of the signal processing resource switching device of the signal processing resource switching system according to the embodiment of the present invention.

DESCRIPTION OF EMBODIMENTS

Hereinafter, a signal processing resource switching system and the like in a form for carrying out the present invention (hereinafter referred to as "the present embodiment") will be described with reference to the accompanying drawings.

Embodiment

[Overview]

Figure 1:
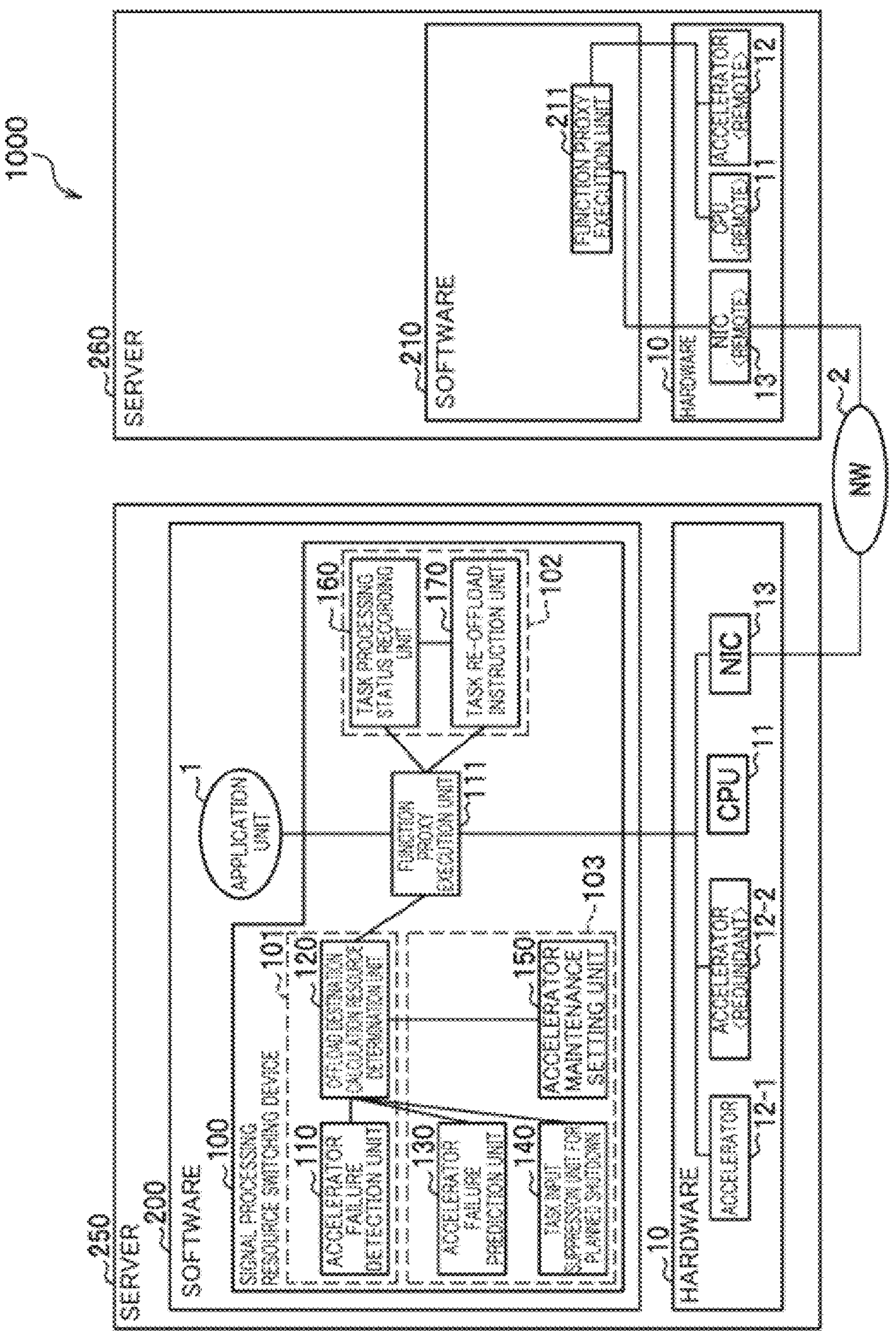
FIG. 1 is a schematic configuration diagram of a signal processing resource switching system according to an embodiment of the present invention.

FIG. 1 is a schematic configuration diagram of a signal processing resource switching system according to an embodiment of the present invention.

As shown in FIG. 1, a signal processing resource switching system 1000 includes a server 250 (server <1>) and a server 260 (server <2>) connected to the server 250 (server <1>) through an NW 2.

In the signal processing resource switching system 1000, the server 250 offloads specific processing of an application to an accelerator disposed in the server 250 or the remote-side server 260 to perform arithmetic processing.

[Server 250 (Server <1>)]

The server 250 (server <1>) includes hardware (HW) 10 and software 200.

<<Hardware 10>>

The hardware 10 includes a CPU 11, a plurality of accelerators 12 (an accelerator 12-1 and an accelerator (redundant) 12-2), and an NIC 13.

<CPU 11>

The CPU 11 executes a function proxy execution unit 111 (software function) in the server 250. The CPU 11 is one of calculation resources that perform calculation together with the accelerator 12-1 and the accelerator (redundant) 12-2.

The content of arithmetic operations which are processed by the CPU 11 together with the accelerator 12-1, the accelerator (redundant) 12-2, and the accelerator (remote) 12 of server <2> may be processed by temporarily using the CPU 11 as an arithmetic resource in the event of a failure.

<Accelerator 12>

The accelerator 12 is a calculation accelerator device such as an FPGA/GPU.

The accelerator 12-1(12) is accelerator hardware mounted in the server 250 and specialized in a specific arithmetic operation, and performs the arithmetic operation on the basis of instructions from the function proxy execution unit 111. The accelerator (redundant) 12-2(12) is accelerator hardware (a second unit) specialized in a specific arithmetic operation, and performs the arithmetic operation on the basis of instructions from the function proxy execution unit 111.

The accelerator 12 accepts, as an input, "function name•argument data ("•" denotes "or" in the following description)" to be arithmetically operated from the function proxy execution unit 111.

The accelerator 12 notifies the function proxy execution unit 111 of the "arithmetic result" as an output.

The accelerator may be in the form of an internal task processing queue, with separate input instructions to be arithmetically operated (enqueue processing) and output instructions for processing results (dequeue instructions).

The accelerator 12 has a certain probability of a failure such as a cooling fan failure.

Meanwhile, the accelerator (redundant) 12-2(12) may be used not only in the event of a failure but also at normal times, and serve as a switching destination in the event of a failure.

<NIC 13>

The NIC 13 is NIC hardware that realizes an NW interface.

In a case where the offload destination of the function proxy execution unit 111 is a remote-side server (server 260), the NIC 13 accepts a notification of a packet of "function name•argument data" to be offloaded by the function proxy execution unit 111, and notifies the NIC (remote) 13 of the server 260.

The NIC 13 accepts, as an input, the "function name•argument data" to be arithmetically operated from the function proxy execution unit 111. The NIC 13 transmits the data to the NIC (remote) 13 of the server 260.

The NIC 13 notifies the function proxy execution unit 111 of a group of "arithmetic result" packets as an output. The NIC 13 receives the data from the NIC (remote) 13 of the server 260.

The NIC 13 receives a group of "function name•argument data" packets from the NIC (remote) 13 of the server 260 as an input. The NIC 13 notifies the function proxy execution unit (remote) 111 of the data.

The NIC 13 transmits a group of "arithmetic result" packets to the NIC (remote) 13 of the server 260 as an output. The NIC 13 receives a notification of the data from a function proxy execution unit (remote) 211.

<<Software 200>>

The software 200 includes an application unit 1 (application) and a signal processing resource switching device 100.

<Application Unit 1>

The application unit 1 is a program which is executed in user space. The application unit 1 is constructed on the premise of using APIs defined by OpenCL (registered trademark), DPDK BBDev API (registered trademark), and the like, and has input and output with these APIs. The application unit 1 has a "function name•argument" for the function proxy execution unit 111 as an output. As an input, a "function execution result" is accepted from the function proxy execution unit 111.

The application unit 1 calls a function group (API) specified as a standard, and offloads some processing to the accelerator 12-1, the accelerator (redundant) 12-2, or the accelerator 12 of the server 260 (server <2>).

[Signal Processing Resource Switching Device 100]

The signal processing resource switching device 100 includes the function proxy execution unit 111, an accelerator failure detection unit 110, an offload destination calculation resource determination unit 120, an accelerator failure prediction unit 130, a task input suppression unit for planned shutdown 140, an accelerator maintenance setting unit 150, a task processing status recording unit 160, and a task re-offload instruction unit 170.

Figure 2:
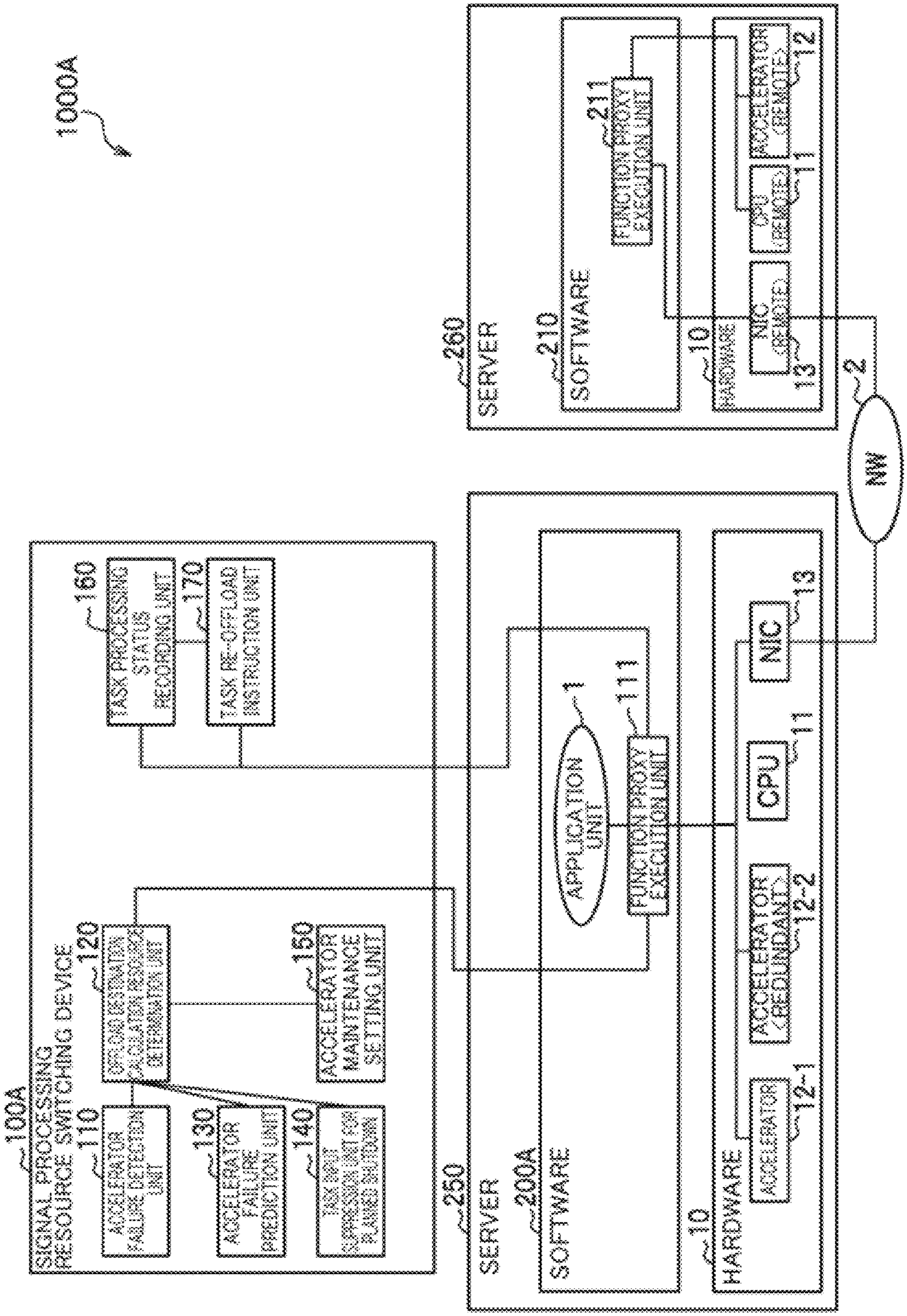
FIG. 2 is a schematic configuration diagram illustrating variation 1 of the disposition of a signal processing resource switching device of the signal processing resource switching system according to the embodiment of the present invention.
Figure 3:
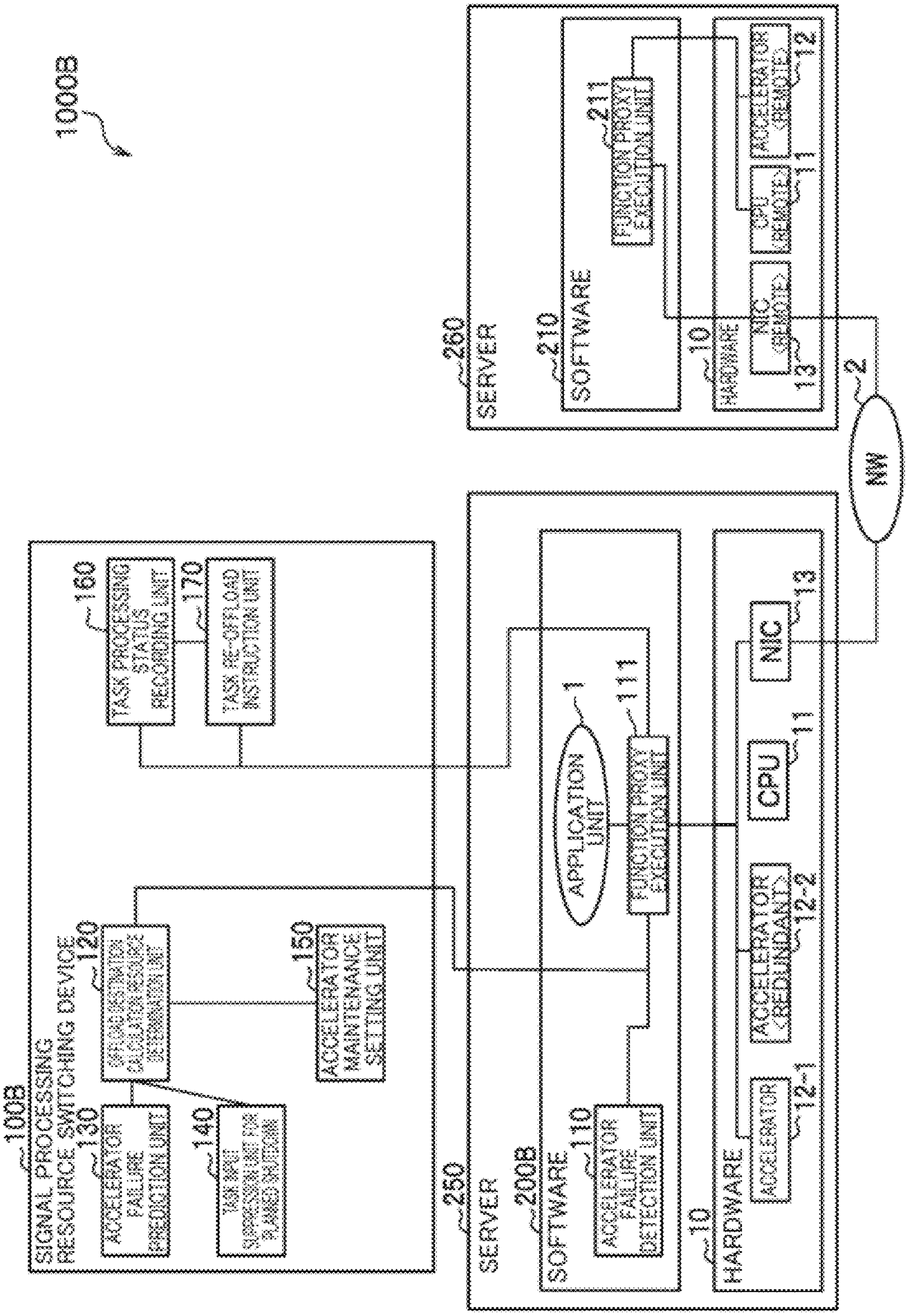
FIG. 3 is a schematic configuration diagram illustrating variation 2 of the disposition of the signal processing resource switching device of the signal processing resource switching system according to the embodiment of the present invention.
Figure 4:
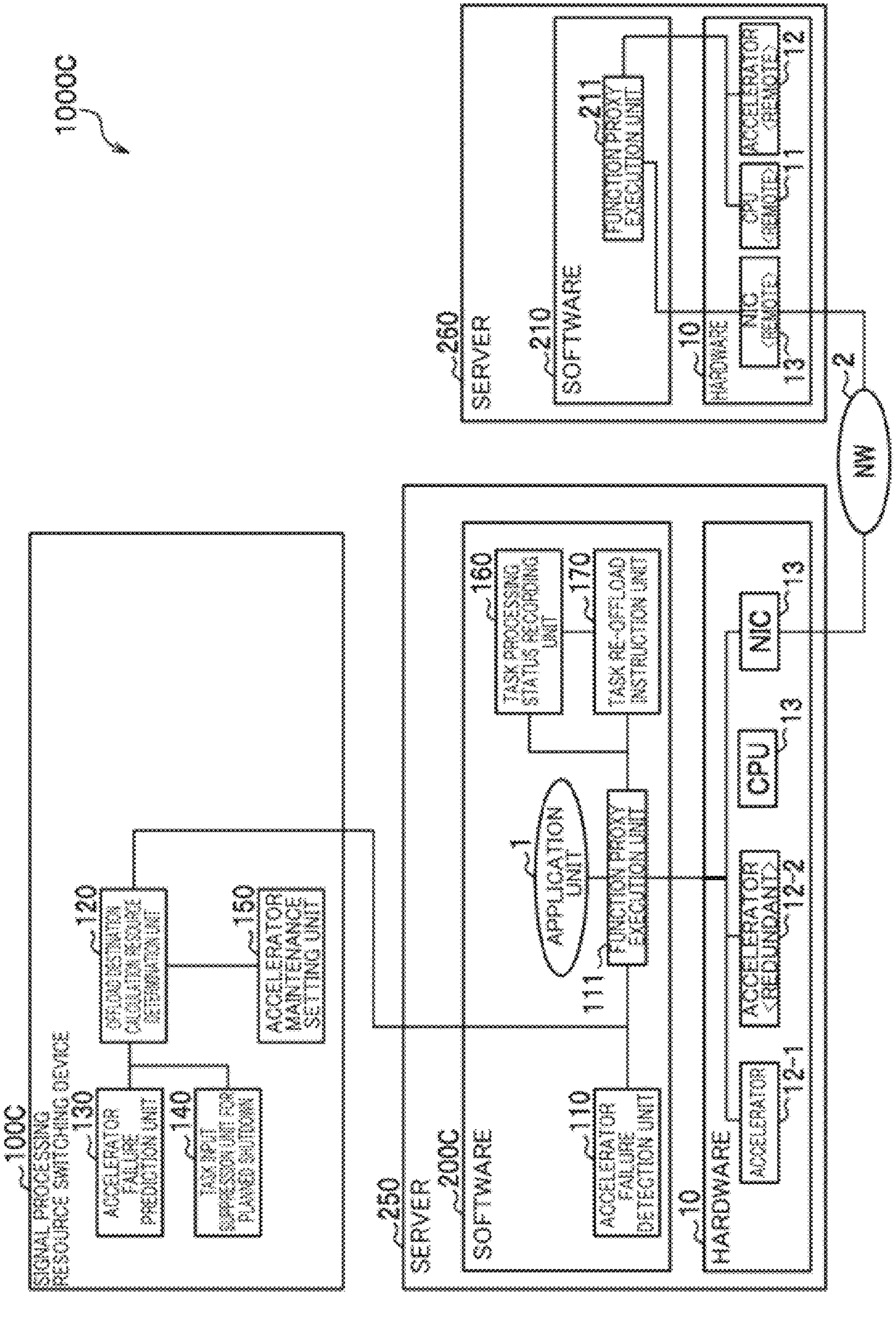
FIG. 4 is a schematic configuration diagram illustrating variation 3 of the disposition of the signal processing resource switching device of the signal processing resource switching system according to the embodiment of the present invention.

Here, the accelerator failure detection unit 110, the offload destination calculation resource determination unit 120, the accelerator failure prediction unit 130, the task input suppression unit for planned shutdown 140, the accelerator maintenance setting unit 150, the task processing status recording unit 160, and the task re-offload instruction unit 170 constitute a controller functional unit (introduced for illustration in the arrangement examples in FIGS. 2 to 4 to be described later).

In addition, a broken line enclosure 101 in FIG. 1 is a functional unit that links function proxy execution and failure detection, and performs switching in the event of a failure without application modification (described in Point 1 of the invention to be described later). A broken line enclosure 102 in FIG. 1 is a functional unit that suppresses the disconnection period in the event of a sudden failure (described in Point 2 of the invention to be described later). A broken line enclosure 103 in FIG. 1 is a functional unit that continues arithmetic operations during switching that can be predicted in advance (described in Point 3 of the invention to be described later).

<Function Proxy Execution Unit 111>

The function proxy execution unit 111 accepts "function name•argument" from the application, notifies the application of argument data of the function when the function is executed or ended by the calculation resource, and performs offloading on the resource determined by the offload destination calculation resource determination unit 120.

The function proxy execution unit 111 is realized as middleware having an IF compatible with a default function. The function proxy execution unit 111 has an interface equivalent to a group of specified API functions such as OpenCL (registered trademark) and DPDK BBdev API (registered trademark).

The function proxy execution unit 111 accepts a function call from a user, and performs offloading on a calculation resource set in advance by the offload destination calculation resource determination unit 120 (to be described later).

The function proxy execution unit 111 is prepared as a binary file separate from the application unit 1 (user application) that receives results, and is realized in a "dynamic library format" in which dynamic linking or calling is performed during execution. Meanwhile, the function proxy execution unit 111 may be in a "static library format" which is linked to the application unit 1 during program generation and executed integrally.

At the start of each function offload, the function proxy execution unit 111 notifies the task processing status recording unit 160 (to be described later) of the function name•argument in order to identify the task that has started processing. At the completion of each function offload, the function proxy execution unit 111 notifies the task processing status recording unit 160 of the function name•argument in order to identify the task that has completed processing.

The function proxy execution unit 111 instructs each device to perform arithmetic operations on the basis of input data in a case where the offload destination set by the offload destination calculation resource determination unit 120 (to be described later) is local (the CPU 11, the accelerator 12-1, the accelerator (redundant) 12-2).

In a case where the offload destination instructed by the offload destination calculation resource determination unit 120 is remote (the server 260), the function proxy execution unit 111 serializes the input data, divides it into packets in accordance with a format such as UDP/IP (User Datagram Protocol/Internet Protocol), and notifies the NIC 13.

The function proxy execution unit 111 accepts "function name•argument" from the application unit 1 as an input.

The function proxy execution unit 111 notifies the task processing status recording unit 160 (to be described later) of argument data of the function as an output when the function is executed or ended.

In a case where the offload destination is local, the function proxy execution unit 111 notifies the calculation resource of either the CPU 11, the accelerator 12-1, or the accelerator (redundant) 12-2 of "function name•argument" as an output.

In a case where the offload destination is remote, the function proxy execution unit 111 transfers "packetized data of function name•argument data" to the NIC 13 as an output.

<Accelerator Failure Detection Unit 110>

The accelerator failure detection unit 110 periodically monitors the state of the accelerator and detects whether a failure has occurred. The periodic execution of a normality confirmation command and the confirmation of the results are used to detect a failure.

In a case where a failure is detected, the accelerator failure detection unit 110 notifies the offload destination calculation resource determination unit 120 of the "identifier failed hardware" as an output.

As a method of detecting the failure of an accelerator, "detection through reception of alert from accelerator hardware" which is a passive failure detection method may be used in addition to "normality confirmation through periodic execution of offload process for test", "monitoring of data process status", and "periodic execution of hardware health check function" which are active detection methods.

<Offload Destination Calculation Resource Determination Unit 120>

The offload destination calculation resource determination unit 120 determines a resource which is not failed (unfailed) and available among the calculation resources.

The offload destination calculation resource determination unit 120 selects an accelerator in which a failure has occurred and a failover destination accelerator serving as a substitute for an accelerator to be switched, sets it in the function proxy execution unit 111, notifies the task re-offload instruction unit 170 of the accelerator in which a failure has occurred and the failover destination accelerator, and instructs the instruction unit to re-input a task.

The offload destination calculation resource determination unit 120 determines the offload destination calculation resource and notifies the function proxy execution unit 111 of the determined resource. Specifically, the offload destination calculation resource determination unit 120 selects an unfailed and available one from among the "the accelerator mounted in the server, the CPU 11, and the accelerator on the remote server side" which are calculation resources, and notifies the function proxy execution unit 111 of the selected one. The offload destination calculation resource determination unit 120 selects a resource that can be processed from available resources at the time of startup and instructs the function proxy execution unit 111 to use the selected resource as the offload destination calculation resource.

Event of Sudden Failure

When a notification of the occurrence of a sudden failure is received from the accelerator failure detection unit 110, the offload destination calculation resource determination unit 120 selects a failover destination accelerator serving as a substitute for the accelerator in which a failure has occurred and sets it in the function proxy execution unit 111. At this time, concurrently, the task re-offload instruction unit 170 is notified of the accelerator in which a failure has occurred and the failover destination accelerator, and is instructed to re-input a task.

When Sudden Failure is Detected

The offload destination calculation resource determination unit 120 accepts, as an input, a failure occurrence notification and the identifier of an accelerator in which a failure has occurred from the accelerator failure detection unit 110.

The offload destination calculation resource determination unit 120 sets an offload destination in the function proxy execution unit 111 as an output.

The offload destination calculation resource determination unit 120 notifies, as an output, the task re-offload instruction unit 170 of the accelerator in which a failure has occurred and the failover destination accelerator.

When Intentional Switching

When a notification of intentional switching is received from the task input suppression unit for planned shutdown 140, the offload destination calculation resource determination unit 120 selects a failover destination accelerator serving as a substitute for an accelerator to be switched, and sets it in the function proxy execution unit 111.

The offload destination calculation resource determination unit 120 accepts a switching schedule notification and the identifier of a switching target accelerator from the task input suppression unit for planned shutdown 140.

Meanwhile, the offload destination calculation resource determination unit 120 may read and set the resource to be processed at the time of startup from a configuration file.

<Accelerator Failure Prediction Unit 130>

The accelerator failure prediction unit 130 predicts the failure of an accelerator and notifies of a switching target accelerator whose failure has been predicted.

The accelerator failure prediction unit 130 periodically monitors the temperature state of the accelerator and determines whether it is in a state where there is a high possibility of a failure or malfunction occurring. In a case where a failure is predicted, the accelerator failure prediction unit 130 notifies the task input suppression unit for planned shutdown 140 of the identifier of the target accelerator and instructs it to suppress input of a new task.

In a case where a failure is predicted, the accelerator failure prediction unit 130 notifies the task input suppression unit for planned shutdown 140 of the identifier of the "failed hardware" as an output.

Meanwhile, the accelerator failure prediction unit 130 may perform a method of "executing a periodic normality confirmation program" or "continuously checking a change in the temperature of an accelerator card and detecting whether the temperature is approaching a certain level or higher" as a method of predicting the failure of an accelerator.

<Task Input Suppression Unit for Planned Shutdown 140>

In a case where a notification of the switching target accelerator is received from the accelerator failure prediction unit 130, the task input suppression unit for planned shutdown 140 instructs the task re-offload instruction unit 170 to suppress input of a new task to the switching target accelerator.

When a notification of intentional switching is received from the accelerator failure prediction unit 130 or the accelerator maintenance setting unit 150, the task input suppression unit for planned shutdown 140 notifies the offload destination calculation resource determination unit 120 of the identifier of the switching target accelerator. This prevents a task from being input to a target accelerator and creates a state in which there is no in-process task, thus enabling the target accelerator to be disconnected.

When Intentional Switching

The task input suppression unit for planned shutdown 140 accepts, as an input, the identifier of the switching target accelerator from the accelerator failure prediction unit 130 and the accelerator maintenance setting unit 150.

The task input suppression unit for planned shutdown 140 notifies, as an output, the offload destination calculation resource determination unit 120 of the identifier of the switching target accelerator, and requests the offload destination to be changed.

Method of Eliminating In-Process Task

In the present embodiment, in order to eliminate the in-process task of a switching target accelerator, it is configured such that the input of a new task is suppressed, and then the in-process task is eliminated with the lapse of time.

Instead of this aspect, the task input suppression unit for planned shutdown 140 may instruct the task re-offload instruction unit 170 to re-input the task to the switching destination.

Detection of No More In-Process Task

The present embodiment does not have a function of explicitly confirm that there is no more in-process task.

Instead of this aspect, the task input suppression unit for planned shutdown 140 may confirm the task processing status of the task processing status recording unit 160, periodically confirm whether there is any in-process task, and notify an operator (human).

<Accelerator Maintenance Setting Unit 150>

The accelerator maintenance setting unit 150 has a function of setting a specific accelerator to be in a disconnectable state on the basis of instructions from an operator (human).

In a case where the above instructions are received, the accelerator maintenance setting unit 150 notifies the task input suppression unit for planned shutdown 140 of the identifier of the target accelerator and instructs it to suppress input of a new task.

In a case where switching based on the above instructions is accepted, the accelerator maintenance setting unit 150 notifies the task input suppression unit for planned shutdown 140 of the "identifier of hardware to be switched" as an output.

Meanwhile, the instructions from an operator may be in the form of triggering instructions from an external operation system instead of a human.

<Task Processing Status Recording Unit 160>

The task processing status recording unit 160 receives the task processing status in a time-series manner from the function proxy execution unit 111, and holds an uncompleted arithmetic task in each calculation resource.

The task processing status recording unit 160 receives the task processing status in a time-series manner from the function proxy execution unit 111, and holds an uncompleted task in each calculation resource. The task processing status recording unit 160 associates the execution start time and completion time of each function on the basis of the input of the function proxy execution unit 111, and manages an uncompleted task in each calculation resource.

The task processing status recording unit 160 accepts, as an input, function argument data from the function proxy execution unit 111 at the start and completion of function execution. The "identifier of a calculation resource" is accepted from the task re-offload instruction unit 170 as an input, and a list of information (function name•argument) of the uncompleted task of the calculation resource is notified of as an output.

<Task Re-Offload Instruction Unit 170>

The task re-offload instruction unit 170 instructs the function proxy execution unit 111 to re-execute the uncompleted arithmetic task of the switching source calculation resource on the basis of the "identifier of a switching source calculation resource" accepted from the offload destination calculation resource determination unit 120.

The task re-offload instruction unit 170 inquires and acquires the uncompleted task from the task processing status recording unit 160 on the basis of the "identifier of a switching destination calculation resource".

The task re-offload instruction unit 170 accepts, as an input, the "identifier of a switching source calculation resource" and the "identifier of a switching destination calculation resource" from the offload destination calculation resource determination unit 120.

The task re-offload instruction unit 170 instructs the function proxy execution unit 111 to re-execute the uncompleted arithmetic task as an output in order to re-execute the offload to the switching destination calculation resource.

[Server 260 (Server <2>)]

The server 260 (server <2>) (remote-side server) includes hardware (HW) 10 and software 210.

<<Hardware 10>>

The hardware 10 includes a CPU (remote) 11, an accelerator (remote) 12, and an NIC (remote) 13.

<CPU 11>

The CPU (remote) 11 executes the function proxy execution unit 211 (software function) in the server 260. The CPU (remote) 11 is one of the calculation resources together with the accelerator (remote) 12.

The content of arithmetic operations which are processed by the CPU (remote) 11 together with the accelerator 12-1, the accelerator (redundant) 12-2, and the accelerator (remote) 12 of server <2> may be processed by temporarily using the CPU 11 as an arithmetic resource in the event of a failure.

<Accelerator 12>

The accelerator (remote) 12 is a calculation accelerator device such as an FPGA/GPU.

The accelerator (remote) 12 is accelerator hardware which is mounted in the server 260 and specialized in a specific arithmetic operation, and performs the arithmetic operation on the basis of instructions from the function proxy execution unit 211.

The accelerator (remote) 12 accepts, as an input, the "function name•argument data" to be arithmetically operated from the function proxy execution unit 211.

The accelerator (remote) 12 notifies, as an output, the function proxy execution unit 211 of the "arithmetic result".

<NIC (Remote) 13>

The NIC (remote) 13 receives the "function name•argument data" transmitted from the server 250, and inputs a group of "function name•argument data" packets to the function proxy execution unit (remote) 211. The NIC (remote) 13 accepts a group of packets including the "arithmetic result" from the function proxy execution unit (remote) 211 and responds to the server 250.

<<Software 210>>

The software 210 includes the function proxy execution unit 211.

<Function Proxy Execution Unit 211>

The function proxy execution unit 211 performs arithmetic offloading on the accelerator (remote) 12 on the basis of the group of "function name•argument data" packets accepted from the NIC (remote) 13. Further, the function proxy execution unit 211 packetizes the arithmetic result and transmits it to the NIC (remote) 13.

The function proxy execution unit 211 accepts the packet of "function name•argument data" from the NIC (remote) 13 as an input.

The function proxy execution unit 211 notifies the NIC (remote) 13 of the packet data of the "arithmetic result" as an output.

The function proxy execution unit 211 transfers the "function name•argument data" as an output to the accelerator (remote) 12, and accepts the arithmetic result as an input.

[Disposition of Signal Processing Resource Switching Device]

Variations in the disposition of the signal processing resource switching device of the signal processing resource switching system will be described below.

The signal processing resource switching system 1000 in FIG. 1 is an example in which the signal processing resource switching device 100 is disposed in the software 210 of the server 250. The controller functional unit of the signal processing resource switching device can also be installed in a separate housing outside the server 250, and will be illustrated below.

FIG. 2 is a schematic configuration diagram illustrating variation 1 of the disposition of the signal processing resource switching device of the signal processing resource switching system. Meanwhile, in each of the following drawings, the same components as those in FIG. 1 are denoted by the same reference numerals and signs, and description of duplicated parts will be omitted.

Variation 1 is an example in a case where the entire controller functional unit is set to be in a separate housing.

As shown in FIG. 2, the signal processing resource switching system 1000A includes the server 250 (server <1>), a signal processing resource switching device 100A installed in a separate housing outside the server 250 (server <1>), and the server 260 (server connected to the server 250 (server <1>) through the NW 2.

Software 200A of the server 250 includes the application unit 1 and the function proxy execution unit 111.

The signal processing resource switching device 100A has a controller functional unit installed outside the server 250 and has the same functions as the signal processing resource switching device 100 in FIG. 1.

FIG. 3 is a schematic configuration diagram illustrating variation 2 of the disposition of the signal processing resource switching device of the signal processing resource switching system.

Variation 2 is an example in a case where the failure detection-related functions of the controller functional unit are placed on the arithmetic server side.

As shown in FIG. 3, the signal processing resource switching system 1000B includes the server 250 (server <1>), a signal processing resource switching device 100B installed in a separate housing outside the server 250 (server <1>), and the server 260 (server <2>) connected to the server 250 (server <1>) through the NW 2.

Software 200B of the server 250 includes the application unit 1, the function proxy execution unit 111, and the accelerator failure detection unit 110.

The signal processing resource switching device 100B is installed outside the server 250, and has a configuration in which the accelerator failure detection unit 110 is removed from the signal processing resource switching device 100 in FIG. 1.

FIG. 4 is a schematic configuration diagram illustrating variation 3 of the disposition of the signal processing resource switching device of the signal processing resource switching system.

Variation 3 is an example in a case where failure detection and task re-offload functions among the controller functions are arranged on arithmetic server side.

As shown in FIG. 4, the signal processing resource switching system 1000C includes the server 250 (server <1>), a signal processing resource switching device 100C installed in a separate housing outside the server 250 (server <1>), and the server 260 (server <2>) connected to the server 250 (server <1>) through the NW 2.

Software 200C of the server 250 includes the application unit 1, the function proxy execution unit 111, the accelerator failure detection unit 110, the task processing status recording unit 160, and the task re-offload instruction unit 170.

The signal processing resource switching device 100C is installed outside the server 250, and has a configuration in which the accelerator failure detection unit 110, the task processing status recording unit 160, and the task re-offload instruction unit 170 are removed from the signal processing resource switching device 100 in FIG. 1.

Hereinbefore, as shown in FIGS. 2 to 4, it is possible to cope with the arrangement of functions to the RIC in the RAN by arranging some or all of the controller functional units independently in a separate housing outside the server 250.

In addition, a plurality of servers 250 can be operated by one signal processing resource switching device. This makes it possible to reduce costs and to improve maintenance of the signal processing resource switching device. In addition, it is possible to dispense with or reduce modification on the server side, and to apply it for general purposes.

[Data Structure of Accelerator]

Figure 5:
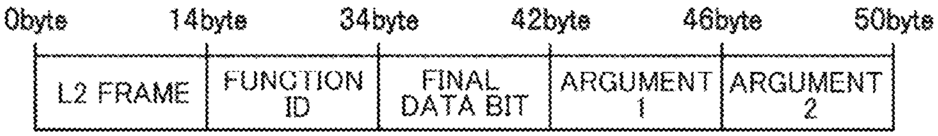
FIG. 5 is a diagram illustrating an example of a data structure of an accelerator (remote) of the signal processing resource switching system according to the embodiment of the present invention.

FIG. 5 is a diagram illustrating an example of a data structure of the accelerator (remote) 12. As shown in FIG. 5, the data structure of the accelerator (remote) 12 is composed of an L2 frame, a function ID, a final data bit, argument 1, and argument 2.

Figure 6:
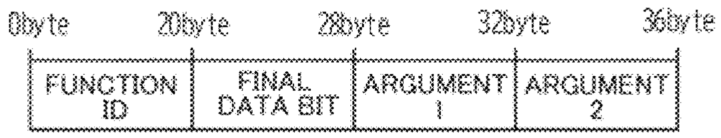
FIG. 6 is a diagram illustrating an example of a data structure for inter-functional exchange of a function ID and argument data of the signal processing resource switching device of the signal processing resource switching system according to the embodiment of the present invention.

FIG. 6 is a diagram illustrating an example of a data structure for inter-functional exchange of a function ID and argument data.

As shown in FIG. 6, the data structure for inter-functional exchange of the function ID and the argument data is composed of a function ID, a final data bit, argument 1, and argument 2 similar to the data structure shown in FIG. 5.

In the present embodiment, the data formats of the NIC 13, the NIC 13 of the server 260, and accelerator 12 are made common, and the data in the memory which is distributed and received as packets is transferred to the accelerator 12 as it is. Therefore, the data structure is made common. Specifically, the data structure created by the function proxy execution unit 211 is defined as the accelerator function•argument data packet as shown in FIGS. 5 and 6. The data formats of the NICs 13, 13 and the accelerator 12 are made common, so that the data received by the NICs 13, 13 can be read as it is by the function proxy execution unit 211.

[Table of Offload Destination Calculation Resource Determination Unit]

FIG. 7 is a diagram illustrating an example of an accelerator management table of the offload destination calculation resource determination unit 120. This accelerator management table is referred to in the flow of switching (failure prediction) intended in advance in FIG. 10.

As shown in FIG. 7, the accelerator management table of the offload destination calculation resource determination unit 120 includes loaded host information, an accelerator identifier, ACC performance (throughput), and the state of an accelerator.

The offload destination calculation resource determination unit 120 refers to the management table shown in FIG. 7 to determine the offload destination calculation resource. For example, "Host-1 (192.168.0.1)" (loaded host information) has an accelerator identifier "FPGA-1", ACC performance (throughput) "10.0 Gbps", and "available". In addition, "Host-2 (192.168.0.2)" (loaded host information) has an accelerator identifier "CPU-1," ACC performance (throughput) "2.0 Gbps", and "allocated" (unavailable).

In particular, "Host-3 (192.168.0.3)" (loaded host information) has an accelerator identifier "ASIC-1", ACC performance (throughput) "10.0 Gbps", and "in failure" (unavailable).

The operation of the signal processing resource switching system 1000 configured as described will be described below.

[Overview]

The present invention satisfies three requirements as follows.

<Requirement 1: Permeability>

The function proxy execution unit 111 separating an application and an accelerator offload process, and switching only the accelerator 12 without application modification.

<Requirement 2: High Availability in the Event of Sudden Failure>

Minimizing switching time by automatic offload destination switching in conjunction with failure detection and automatic re-input based on the accelerator task processing status.

<Requirement 3: Continuation of Processing Upon Intentional Disconnection>

Suppressing input of a task to the switching target accelerator and continuing arithmetic operation by switching after confirming that the task is empty. In addition, the device configuration of the present embodiment does not require full duplication and has high equipment efficiency.

The above <Requirement 1: permeability>, <Requirement 2: High availability in the event of sudden failure>, and <Requirement 3: Continuation of processing upon intentional disconnection> are solved by the following (1) Point 1 of the invention, (2) Point 2 of the invention, and (3) Point 3 of the invention.

(1) Point 1 of the invention: Link of function proxy execution and failure detection, switching at the event of a failure without application modification (the broken line enclosure functional unit 101 in FIG. 1)

The function proxy execution unit 111 makes it possible to switch the offload destination without changing the application. This allows the accelerator to be switched without restarting up or shifting the application. Further, <Requirement 1: Permeability> is realized by automatically performing switching in accordance with the failure detection result.

(2) Point 2 of the invention: Suppression of the disconnection period in the event of a sudden failure (the broken line enclosure functional unit 102 in FIG. 1)

Automatic processing continuation by automatic task re-offloading in the event of an accelerator failure is realized. Specifically, the task processing status recording unit 160 that manages the remaining tasks records tasks that have not yet been processed by the accelerator, and the task re-offload instruction unit 170 automatically performs re-offloading in the event of a sudden failure. This achieves both <Requirement 1: Permeability> and <Requirement 2: High availability in the event of sudden failure>.

(3) Point 3 of the invention: Continuation of arithmetic operation during switching that can be predicted in advance (the broken line enclosure functional unit 103 in FIG. 1)

Uninterruptible switching during intentional disconnection by suppressing the input of the accelerator task is realized. Specifically, the accelerator failure prediction unit 130 predicts the failure of an accelerator, and for the accelerator to be disconnected, the task input suppression unit for planned shutdown 140 suppresses the task input and switches the offload destination to another calculation resource. This allows <Requirement 3: Continuation of processing upon intentional disconnection> to be realized.

[Operation]

The operation of the signal processing resource switching system is the same for the signal processing resource switching system 1000 in FIG. 1, the signal processing resource switching system 1000A in FIG. 2, the signal processing resource switching system 1000B in FIG. 3, and the signal processing resource switching system 1000C in FIG. 4. That is, in the signal processing resource switching system, there is no difference in operation depending on the location of the signal processing resource switching device.

[Sequence in Offloading]

Figure 8A:
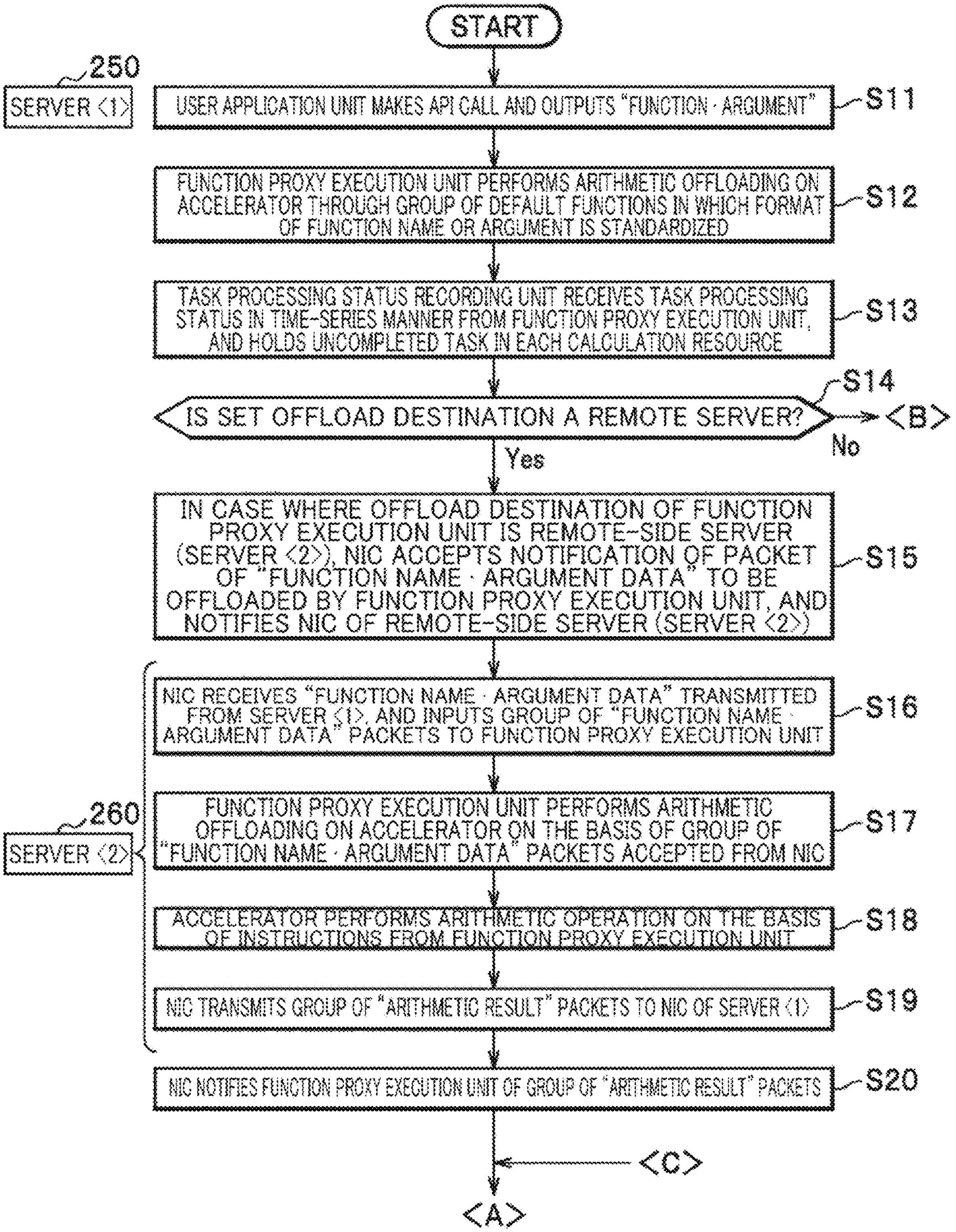
FIG. 8A is a flowchart illustrating sequence 1 in offloading of the signal processing resource switching system according to the embodiment of the present invention.
Figure 8B:
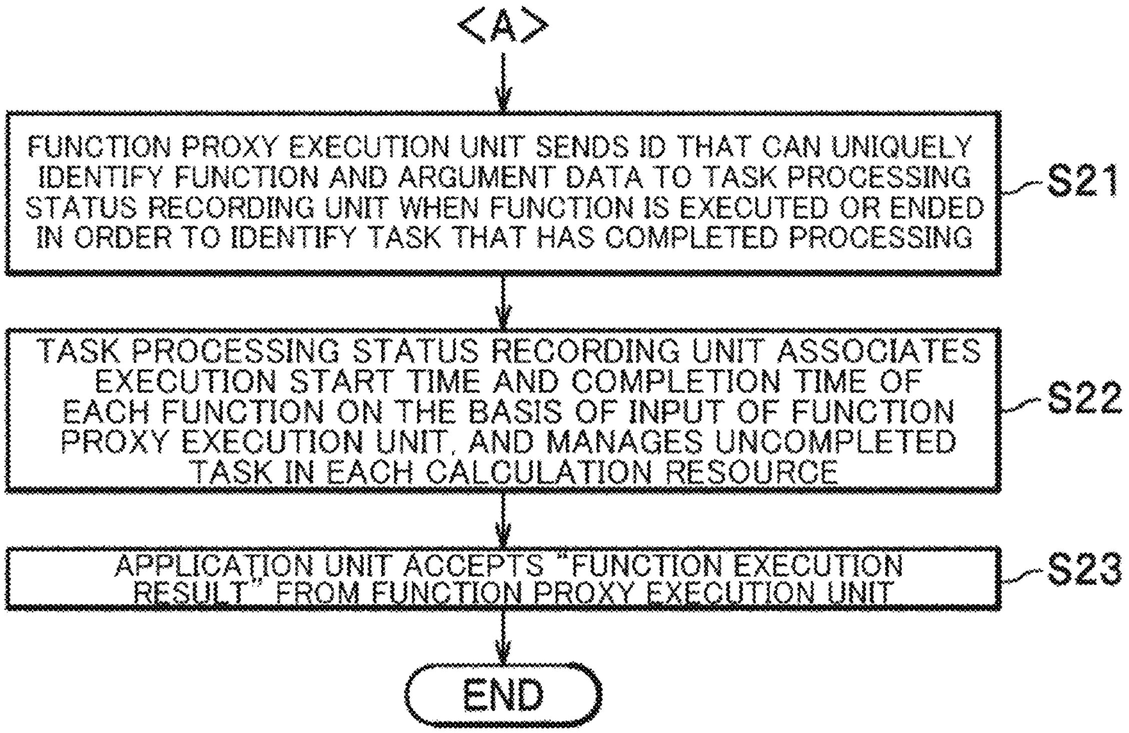
FIG. 8B is a flowchart illustrating sequence 1 in offloading of the signal processing resource switching system according to the embodiment of the present invention.
Figure 8C:
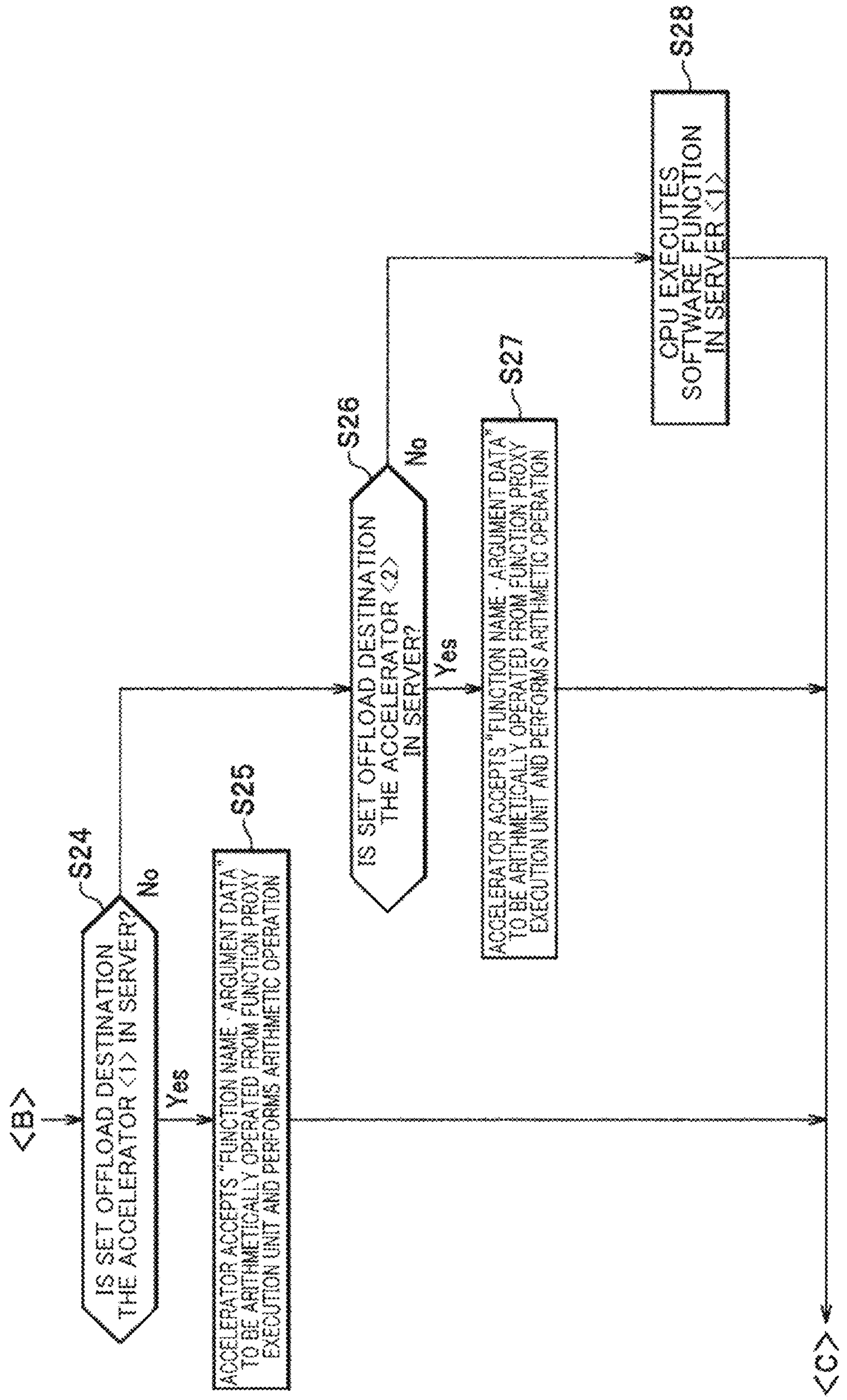
FIG. 8C is a flowchart illustrating sequence 1 in offloading of the signal processing resource switching system according to the embodiment of the present invention.

FIGS. 8A to 8C are flowcharts illustrating sequence 1 in offloading of the signal processing resource switching system. This flow basically shows the processing of the server 250 (server <1>), and partially shows the processing (S16-S19 in FIG. 8A) of the server 260 (server <2>). In FIG. 8A, in step S11, the application unit 1 makes an API call and outputs "function•argument".

In step S12, the function proxy execution unit 111 performs arithmetic offloading on the accelerator using a group of default functions in which the format of a function name or argument is standardized.

In step S13, the task processing status recording unit 160 receives the task processing status in a time-series manner from the function proxy execution unit 111, and holds an uncompleted task in each calculation resource.

In step S14, the offload destination calculation resource determination unit 120 determines whether the set offload destination is a remote server.

In a case where the set offload destination is a remote server (S14: Yes), in step S15, the NIC 13 accepts a notification of the packet of "function name•argument data" to be offloaded by the function proxy execution unit 111 in a case where the offload destination of the function proxy execution unit 111 is the remote-side server 260 (server <2>), and notifies the NIC 13 of the remote-side server 260 (server <2>).

In step S16, the NIC 13 of the remote-side server 260 (server <2>) receives the "function name•argument data" transmitted from server <1>, and inputs the group of "function name•argument data" packets to the function proxy execution unit 111.

In step S17, the function proxy execution unit 211 of the remote-side server 260 (server <2>) performs arithmetic offloading on the accelerator (remote) 12 on the basis of the group of "function name•argument data" packets accepted from the NIC (remote) 13.

In step S18, the accelerator (remote) 12 of the remote-side server 260 (server <2>) performs an arithmetic operation on the basis of instructions from the function proxy execution unit 211.

In step S19, the NIC (remote) 13 transmits the group of "arithmetic result" packets to the NIC 13 of the server 250 (server <1>).

Hereinafter, step S20 and the subsequent steps are processes of the server 250 (server <1>). In step S20, the NIC 13 of the server 250 (server <1>) notifies the function proxy execution unit 111 of the group of "arithmetic result" packets, and the process proceeds to step S21 of FIG. 8B. Meanwhile, the process also proceeds to step S21 subsequently to the processes of step S25, step S27, and step S28 of FIG. 8C which will be described later.

In step S21 of FIG. 8B, the function proxy execution unit 111 sends an ID that can uniquely identify the function and argument data to the task processing status recording unit 160 when the function is executed or ended in order to identify the task that has completed processing.

In step S22, the task processing status recording unit 160 associates the execution start time and completion time of each function on the basis of the input of the function proxy execution unit 111, and manages an uncompleted task in each calculation resource.

In step S23, the application unit 1 accepts the "function execution result" from the function proxy execution unit 111 and ends the processing of this flow.

In a case where the offload destination set in step S14 is not a remote server (S14: No), in step S24 of FIG. 8C, the offload destination calculation resource determination unit 120 determines whether the set offload destination is the accelerator 12-1 (accelerator <1>) in the server.

In a case where the set offload destination is the accelerator 12-1 in the server (S24: Yes), in step S25, the accelerator 12-1 accepts the "function name•argument data" to be arithmetically operated from the function proxy execution unit 111, performs the arithmetic operation, and proceeds to step S21 of FIG. 8B.

In a case where the set offload destination is not the accelerator 12-1 in a server (S24: No), in step S26, the offload destination calculation resource determination unit 120 determines whether the set offload destination is the accelerator (redundant) 12-2 (accelerator <2>) in the server.

In a case where the set offload destination is the accelerator 12-2 in the server (S26: Yes), in step S27, the accelerator 12-2 accepts the "function name•argument data" to be arithmetically operated from the function proxy execution unit 111, performs the arithmetic operation, and proceeds to step S21 of FIG. 8B.

In a case where the set offload destination is not the accelerator 12-2 in the server (S26: No), in step S28, the CPU 11 executes a software function in server <1> and proceeds to step S21 of FIG. 8B.

[Sequence When Sudden Failure Occurs]

Figure 9:
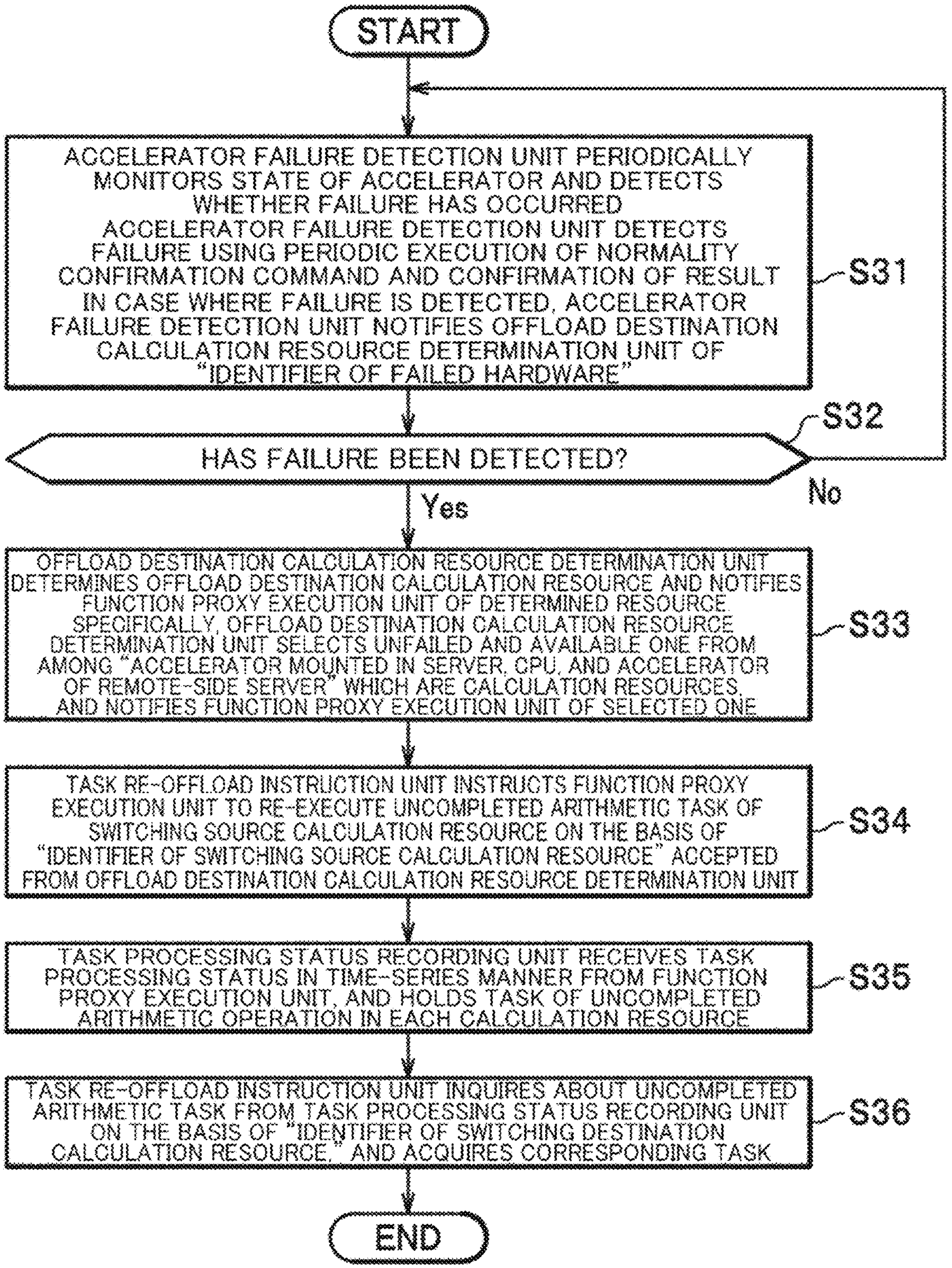
FIG. 9 is a flowchart illustrating sequence 2 when a sudden failure occurs in the signal processing resource switching system according to the embodiment of the present invention.

FIG. 9 is a flowchart illustrating sequence 2 when a sudden failure occurs in the signal processing resource switching system.

In step S31, the accelerator failure detection unit 110 periodically monitors the state of the accelerator and detects whether a failure has occurred. Specifically, the accelerator failure detection unit 110 detects a failure using periodic execution of a normality confirmation command and confirmation of the result. In addition, in a case where a failure is detected, the accelerator failure detection unit 110 notifies the offload destination calculation resource determination unit 120 of the "identifier of failed hardware".

In step S32, the accelerator failure detection unit 110 determines whether a failure has been detected, and the process returns to step S31 in a case where a failure has not been detected (S32: No).

In a case where a failure is detected (S32: Yes), in step S33, the offload destination calculation resource determination unit 120 determines the offload destination calculation resource and notifies the function proxy execution unit 111 of the determined resource. Specifically, the offload destination calculation resource determination unit 120 selects an unfailed and available one from among "the accelerators 12-1 and 12-2 mounted on the server, the CPU 11, and the accelerator (remote) 12 of the remote-side server" which are calculation resources, and notifies the function proxy execution unit 111 of the selected one.

In step S34, the task re-offload instruction unit 170 instructs the function proxy execution unit 111 to re-execute the uncompleted arithmetic task of the switching source calculation resource on the basis of the "identifier of a switching source calculation resource" accepted from the offload destination calculation resource determination unit 120.

In step S35, the task processing status recording unit 160 receives the task processing status in a time-series manner from the function proxy execution unit 111, and holds the task of uncompleted arithmetic operation in each calculation resource.

In step S36, the task re-offload instruction unit 170 inquires about the uncompleted arithmetic task from the task processing status recording unit 160 on the basis of the "identifier of a switching destination calculation resource", acquires the corresponding task, and ends this flow.

[Sequence of Switching (Failure Prediction) Intended in Advance]

Figure 10:
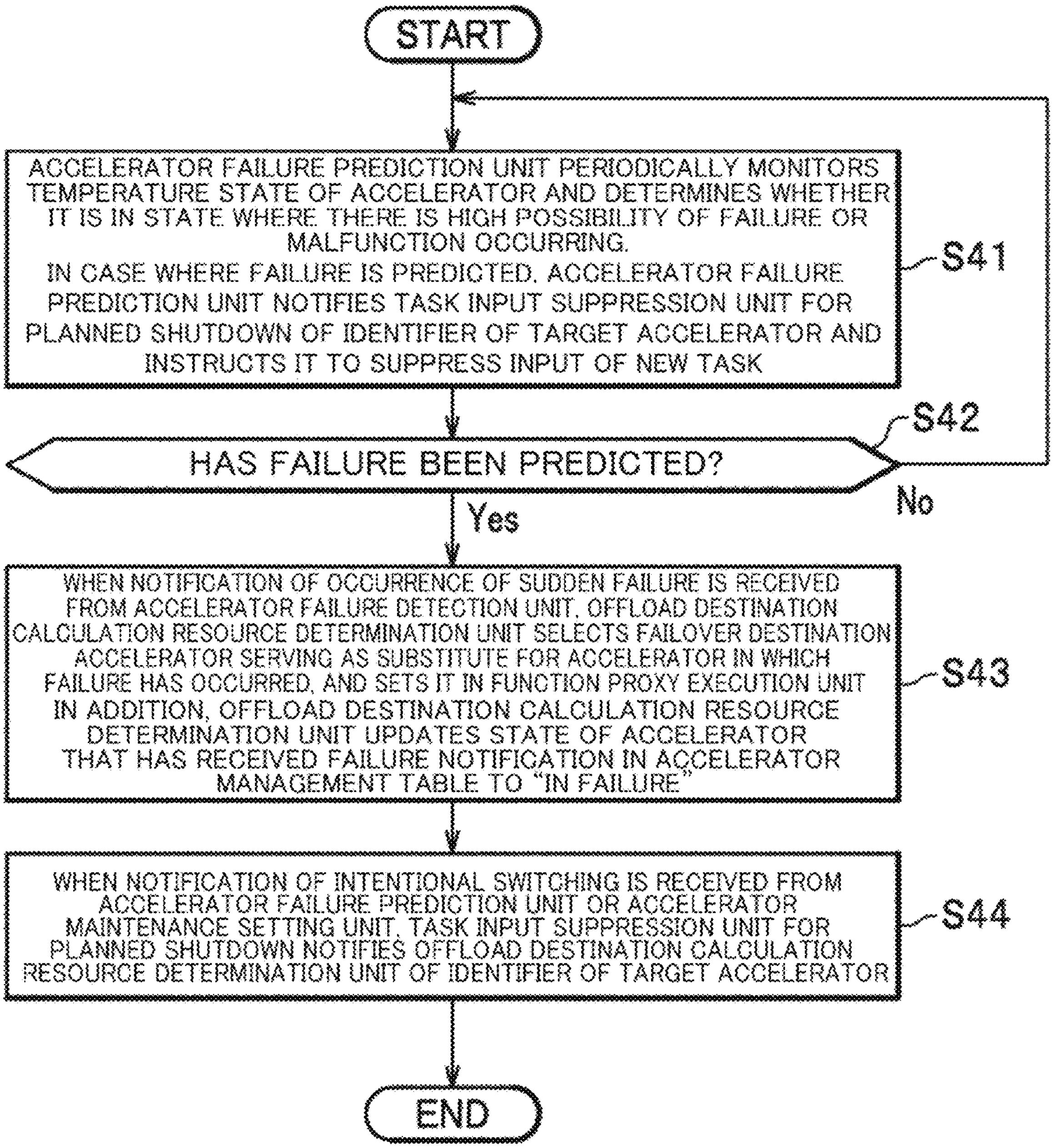
FIG. 10 is a flowchart illustrating sequence 3 of switching (failure prediction) intended in advance in the signal processing resource switching system according to the embodiment of the present invention.

FIG. 10 is a flowchart illustrating sequence 3 of switching (failure prediction) intended in advance in the signal processing resource switching system.

In step S41, the accelerator failure detection unit 110 periodically monitors the temperature state of the accelerators (the accelerators 12-1 and 12-2 and the accelerator (remote) 12 of the remote-side server) and determines whether it is in a state where there is a high possibility of a failure or malfunction occurring. The failure of an accelerator can be predicted when the temperature of the accelerator increases such as in a case where a cooling fan fails. In a case where a failure is predicted, the accelerator failure prediction unit 130 notifies the task input suppression unit for planned shutdown 140 of the identifier of the target accelerator and instructs it to suppress input of a new task.

When the accelerator failure detection unit 110 does not predict a failure in step S42 (S42: No), the process returns to step S41. In a case where a failure is predicted (S42: Yes), in step S43, the offload destination calculation resource determination unit 120 selects a failover destination accelerator serving as a substitute for the accelerator in which a failure has occurred and sets it in the function proxy execution unit 111 when a notification of the occurrence of a sudden failure is received from the accelerator failure detection unit 110. In addition, the offload destination calculation resource determination unit 120 updates the state of the accelerator that has received a failure notification in the accelerator management table to "in failure".

In step S44, when an instruction for intentional switching is received from the accelerator failure prediction unit 130 or the accelerator maintenance setting unit 150, the task input suppression unit for planned shutdown 140 notifies the offload destination calculation resource determination unit 120 of the identifier of the target accelerator and ends this flow.

[Sequence of Instructions by Switching (Human (Operator)) Intended in Advance]

Figure 11:
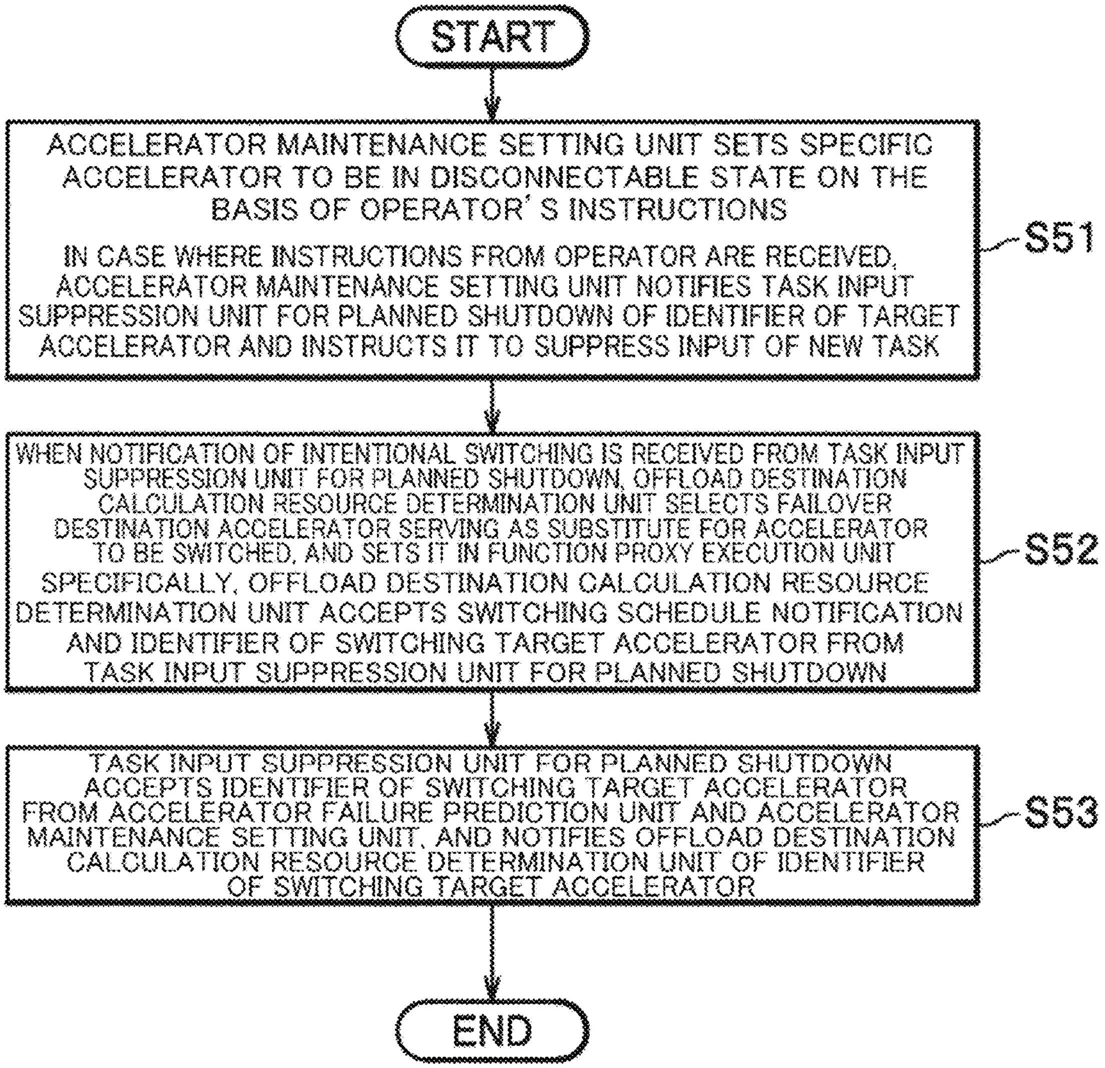
FIG. 11 is a flowchart illustrating sequence 4 of switching (instructions by an operator) intended in advance in the signal processing resource switching system according to the embodiment of the present invention.

FIG. 11 is a flowchart illustrating sequence 4 of instructions by switching (human (operator)) intended in advance in the signal processing resource switching system.

In step S51, the accelerator maintenance setting unit 150 sets a specific accelerator to be in a disconnectable state on the basis of the operator's instructions. Specifically, in a case where the operator's instructions are received, the accelerator maintenance setting unit 150 notifies the task input suppression unit for planned shutdown 140 of the identifier of the target accelerator and instructs it to suppress input of a new task.

In step S52, when a notification of intentional switching is received from the task input suppression unit for planned shutdown 140, the offload destination calculation resource determination unit 120 selects a failover destination accelerator serving as a substitute for an accelerator to be switched, and sets it in the function proxy execution unit 111. Specifically, the offload destination calculation resource determination unit 120 accepts a switching schedule notification and the identifier of a switching target accelerator from the task input suppression unit for planned shutdown 140.

In step S53, the task input suppression unit for planned shutdown 140 accepts the identifier of the switching target accelerator from the accelerator failure prediction unit 130 and the accelerator maintenance setting unit 150, notifies the offload destination calculation resource determination unit 120 of the identifier of the switching target accelerator, and ends this flow.

[Sequence of Rule for Selecting Failure Switching Targets]

Figure 12:
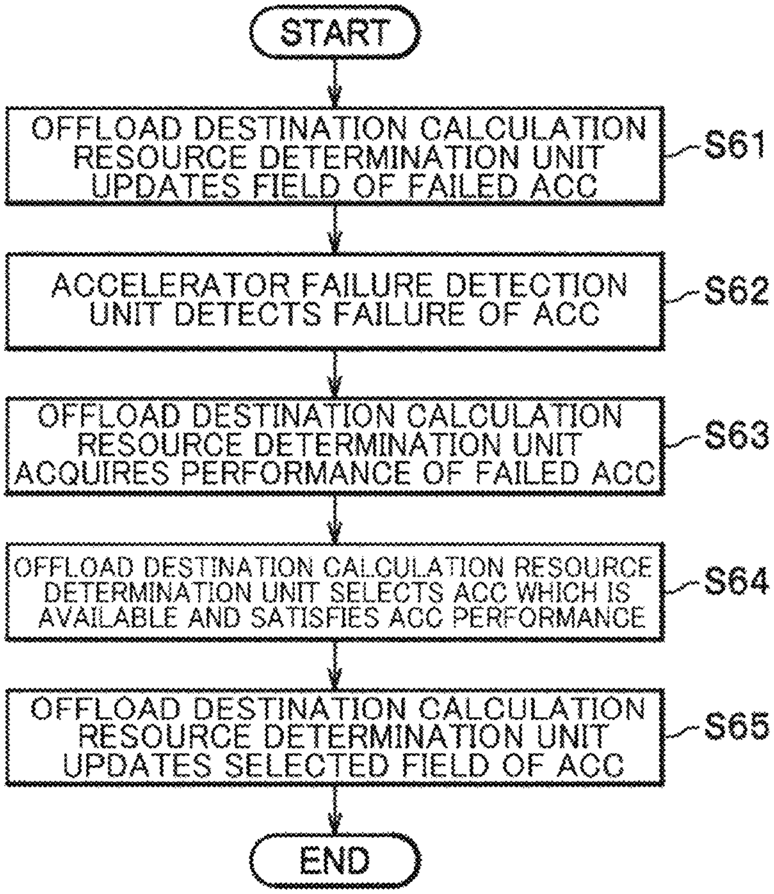
FIG. 12 is a flowchart illustrating sequence 5 of a rule for selecting failure switching targets in the signal processing resource switching system according to the embodiment of the present invention.

FIG. 12 is a flowchart illustrating sequence 5 of a rule for selecting failure switching targets. In addition, the offload destination calculation resource determination unit 120 refers to the accelerator management table shown in FIG. 7.

In step S61, the offload destination calculation resource determination unit 120 updates the field of the failed ACC. For example, the state of ASIC-1 of Host-3 is set to "in failure" on the basis of the loaded host information in the accelerator management table shown in FIG. 7.

In step S62, the accelerator failure detection unit 110 detects the failure of the ACC. In the above example, the failure of ASIC-1 of Host-3 is detected.

In step S63, the offload destination calculation resource determination unit 120 acquires performance of the failed ACC. In the above example, the ACC performance of 10.0 Gbps for ASIC-1 of Host-3 is acquired.

In step S64, the offload destination calculation resource determination unit 120 selects an ACC which is available and satisfies the ACC performance. In the above example, FPGA-1 of Host-1 is selected.

In step S65, the offload destination calculation resource determination unit 120 updates the field of the selected ACC and ends this flow. In the above example, the accelerator management table (FIG. 7) is updated so that the state of FPGA-1 of Host-1 is allocated.

[Sequence Upon Return After Failure Recovery]

Figure 13:
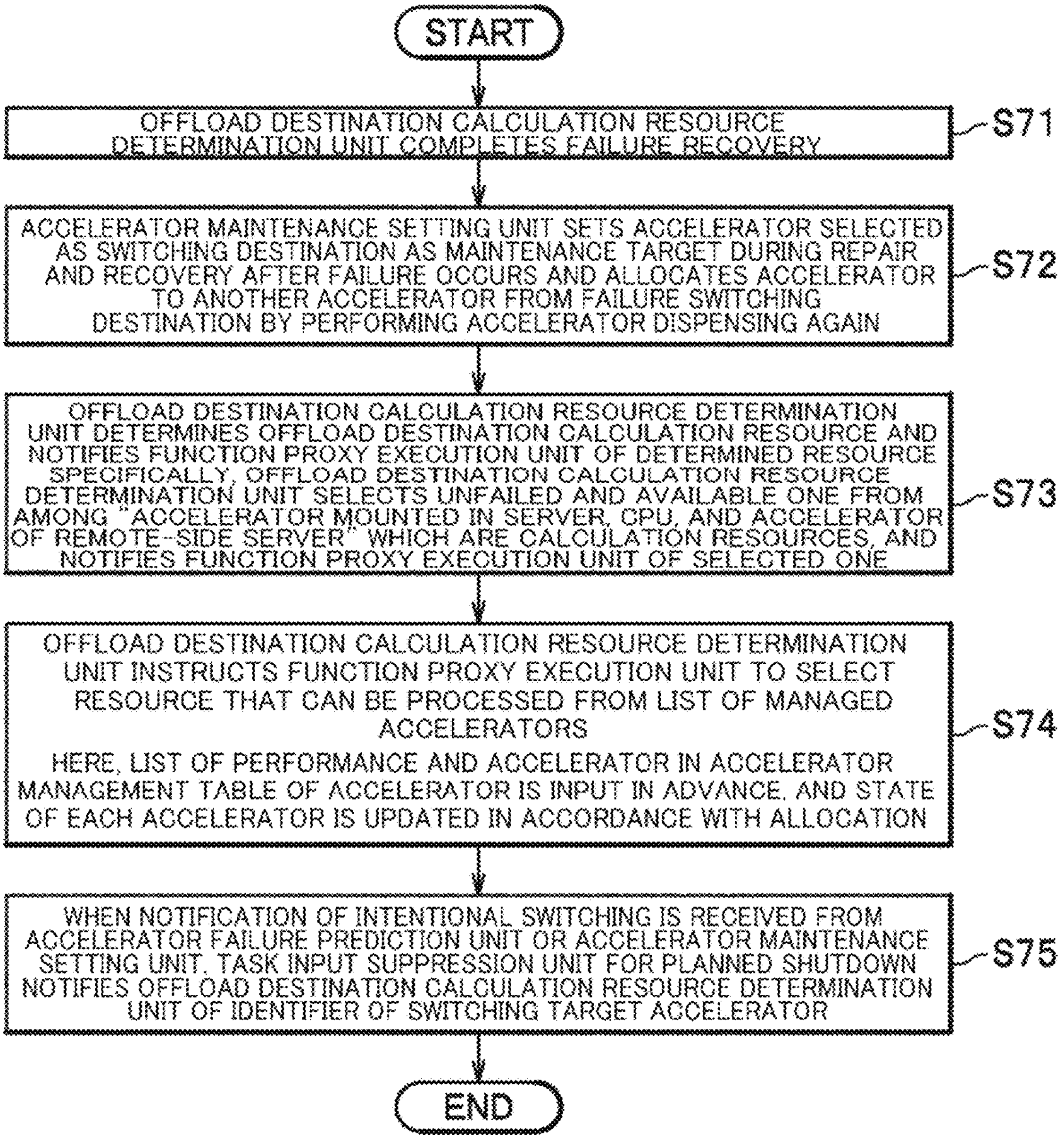
FIG. 13 is a flowchart illustrating sequence 6 upon return after failure recovery of the signal processing resource switching system according to the embodiment of the present invention.

FIG. 13 is a flowchart illustrating sequence 6 upon return after failure recovery of the signal processing resource switching system.

The offload destination calculation resource determination unit 120 starts a failure recovery completion process (step S71).

In step S72, the accelerator maintenance setting unit 150 sets the accelerator selected as a switching destination as a maintenance target during repair and recovery after a failure occurs, and allocates the accelerator to another accelerator from the failure switching destination by performing accelerator dispensing again.

In step S73, the offload destination calculation resource determination unit 120 determines the offload destination calculation resource and notifies the function proxy execution unit 111 of the determined resource. Specifically, the offload destination calculation resource determination unit 120 selects an unfailed and available one from among the accelerators 12-1 and 12-2 mounted in the server 250, the CPU 11, and the accelerator 12 of the remote-side server 260 which are calculation resources, and notifies the function proxy execution unit 111 of the selected one.

In step S74, the offload destination calculation resource determination unit 120 instructs the function proxy execution unit 111 to select a resource that can be processed from the accelerator management table (FIG. 7) of the managed accelerators. Here, a list of performance and accelerators in the accelerator management table of accelerators is input in advance, and the state of each accelerator is updated in accordance with allocation (step S65 of FIG. 12).

When a notification of intentional switching is received from the accelerator failure prediction unit 130 or the accelerator maintenance setting unit 150, in step S75, the task input suppression unit for planned shutdown 140 notifies the offload destination calculation resource determination unit 120 of the identifier of the switching target accelerator, and ends this flow.

[Hardware Configuration]

Figure 14:
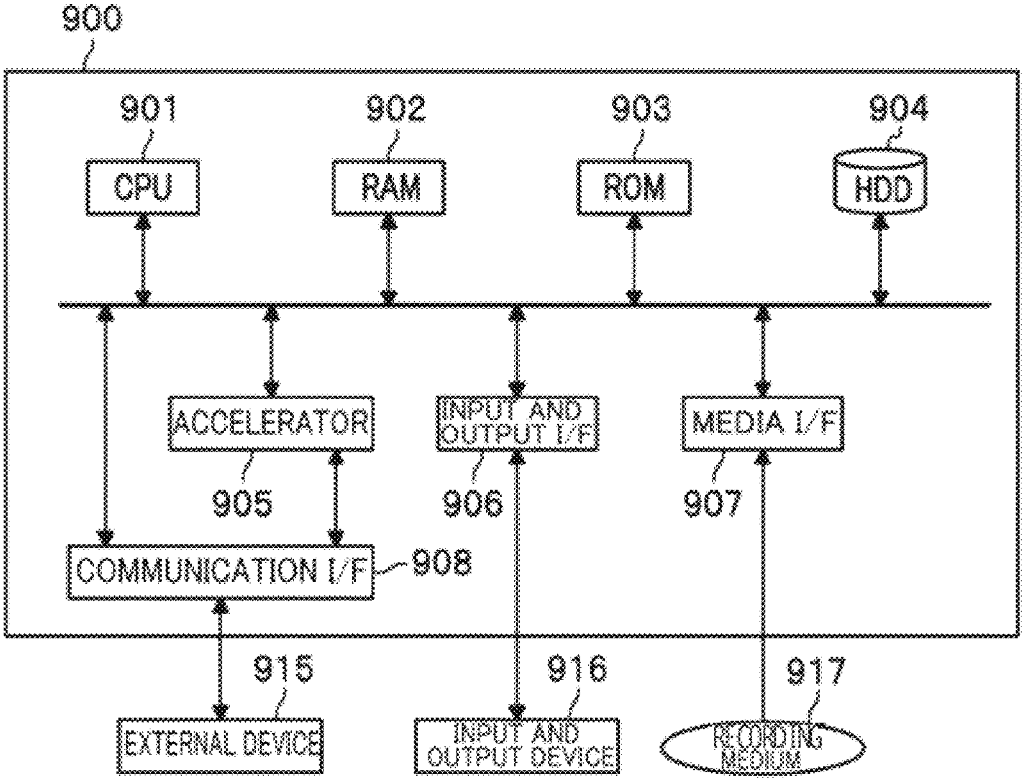
FIG. 14 is a hardware configuration diagram illustrating an example of a computer that realizes the functions of the signal processing resource switching device of the signal processing resource switching system according to the embodiment of the present invention.
Figure 15:
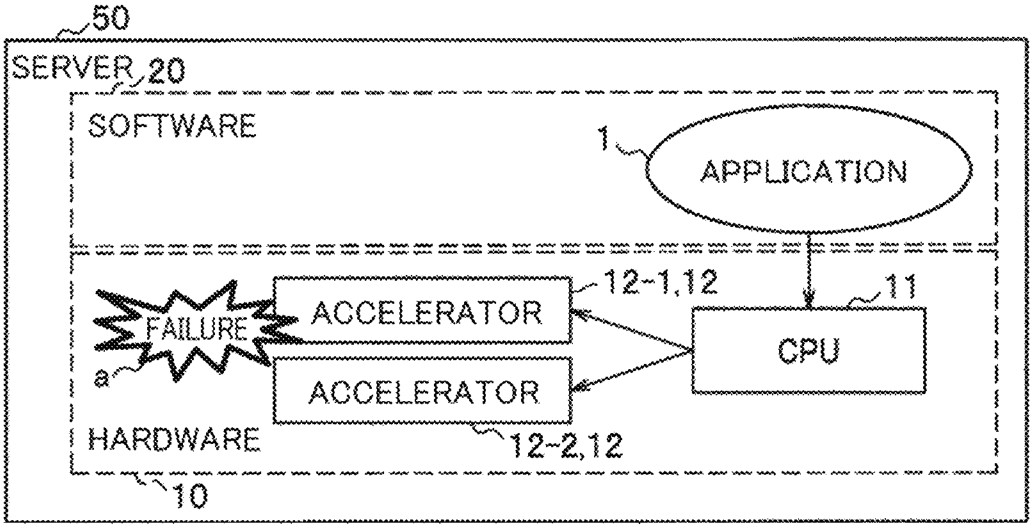
FIG. 15 is a diagram illustrating a computer system.
Figure 16:
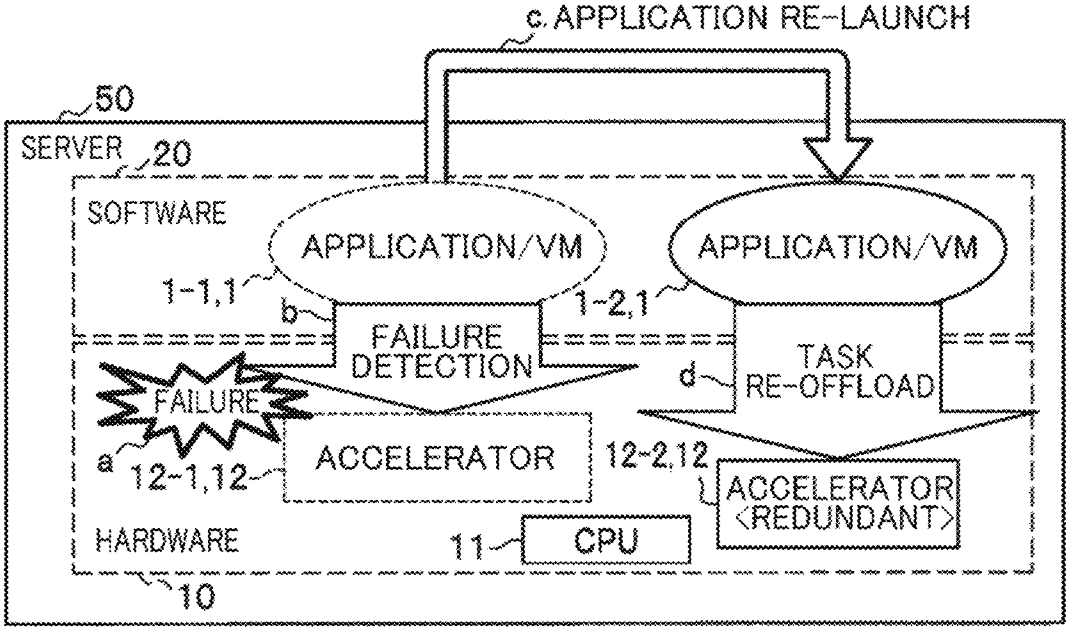
FIG. 16 is a diagram illustrating re-launching of an application/VM within the same server in NPL 1.

The signal processing resource switching devices 100 and 100A to 100C (100 to 100C) of the signal processing resource switching systems 1000 and 1000A to 1000C (1000 to 1000C) according to the embodiment are realized by, for example, a computer 900 configured as shown in FIG. 14.

FIG. 14 is a hardware configuration diagram illustrating an example of the computer 900 that realizes the functions of the signal processing resource switching devices 100 to 100C.

The signal processing resource switching devices 100 to 100C includes a CPU 901, a RAM 902, a ROM 903, a HDD 904, an accelerator 905, an input and output interface (I/F) 906, a media interface (I/F) 907, and a communication interface (I/F) 908. The accelerator 905 corresponds to the accelerators 12-1 and 12-2 in FIGS. 1 to 4.

The accelerator 905 is the accelerator (device) 12-1, 12-2 (FIGS. 1 to 4) that processes at least one piece of data of data from the communication I/F 908 or data from the RAM 902 at high speed. Meanwhile, the accelerator 905 may be of a type (look-aside type) that returns the execution result to the CPU 901 or the RAM 902 after executing processing from the CPU 901 or the RAM 902. On the other hand, as the accelerator 905, a type (in-line type) that is inserted between the communication I/F 908 and the CPU 901 or the RAM 902 and performs processing may be used.

The accelerator 905 is connected to an external device 915 through the communication I/F 908. The input/output I/F 906 is connected to an input/output device 916. The medium I/F 907 reads and writes data from and to a recording medium 917.

The CPU 901 operates on the basis of a program stored in the ROM 903 or the HDD 904 and executes a program (also called an application or an app as its abbreviation) read in the RAM 902 to perform control of each unit of the signal processing resource switching devices 100 to 100C shown in FIGS. 1 to 4. This program can also be distributed through a communication line or recorded and distributed on the recording medium 917 such as a CD-ROM.

The ROM 903 stores a boot program to be executed by the CPU 901 when the computer 900 is activated, a program that depends on the hardware of the computer 900, and the like.

The CPU 901 controls the input/output device 916 constituted by an input unit such as a mouse or a keyboard, and an output unit such as a display or a printer, through the input/output I/F 906. The CPU 901 acquires data from the input/output device 916 and outputs the generated data to the input/output device 916 through the input/output I/F 906. Meanwhile, a graphics processing unit (GPU) or the like may be used as the processor together with the CPU 901.

The HDD 904 stores a program executed by the CPU 901, data used by the program, and the like. The communication I/F 908 receives data from other devices through a communication network (for example, network (NW)), outputs the data to the CPU 901, and transmits the data generated by the CPU 901 to other devices through the communication network.

The medium I/F 907 reads a program or data stored in a recording medium 917 and outputs it to the CPU 901 through the RAM 902. The CPU 901 loads the program according to target processing from the recording medium 917 on the RAM 902 through the medium I/F 907 and executes the loaded program. The recording medium 917 includes an optical recording medium such as a digital versatile disc (DVD), a phase change rewritable disk (PD), a magneto-optical recording medium such as a magneto optical disk (MO), a magnetic recording medium, a conductor memory tape medium, a semiconductor memory, or the like.

For example, in a case where the computer 900 functions as a server 250 configured as one device according to the present embodiment, the CPU 901 of the computer 900 realizes the functions of the server 250 by executing a program loaded onto the RAM 902. In addition, data in the RAM 902 is stored in the HDD 904. The CPU 901 reads a program related to target processing from the recording medium 917 and executes the program. In addition, the CPU 901 may read the program related to the target processing from another device through the communication network.

[Effects]

As described above, there are provided signal processing resource switching devices 100 to 100C (FIGS. 1 to 4) having a plurality of accelerators (accelerators 12-1 and 12-2) and switching a calculation resource which is an offload destination when specific processing of an application is offloaded to the accelerators to perform arithmetic processing, the devices including: a function proxy execution unit 111 configured to accept a "function name•argument" from an application (application unit 1) and notify the application of argument data of a function when the function is executed or ended by the calculation resource, an accelerator failure detection unit 110 configured to detect a failure of the accelerator, and an offload destination calculation resource determination unit 120 configured to determine an unfailed and available resource among the calculation resources, wherein the function proxy execution unit 111 performs offloading on the resource determined by the offload destination calculation resource determination unit 120.

As described above, in a computer system equipped with an accelerator, the accelerator may fail by itself, and it is necessary to continue calculation at this time.

The function proxy execution unit 111 separates an application and an accelerator offload process, and switches only the accelerator 12 without application modification. In addition, the function proxy execution unit 111 makes it possible to switch the offload destination without changing the application. This allows the accelerator to be switched without restarting up or shifting the application. Further, <Requirement 1: Permeability> is realized by automatically performing switching in accordance with the failure detection result. As a result, it is possible to continue arithmetic processing to the maximum extent possible without instructions from the application when the accelerator is unavailable.

The signal processing resource switching systems 1000 to 1000C (FIGS. 1 to 4) further include a task processing status recording unit 160 configured to receive a task processing status in a time-series manner from the function proxy execution unit 111 and hold an uncompleted arithmetic task in each calculation resource, and a task re-offload instruction unit 170 configured to instruct the function proxy execution unit 111 to re-execute an uncompleted arithmetic task of a switching source calculation resource on the basis of an "identifier of the switching source calculation resource" accepted from the offload destination calculation resource determination unit 120.

In this way, the task processing status recording unit 160 that manages the remaining tasks records tasks that have not yet been processed by the accelerator, and the task re-offload instruction unit 170 automatically performs re-offloading in the event of a sudden failure. This makes it possible to achieve both <Requirement 1: Permeability> and <Requirement 2: High availability in the event of sudden failure>. <Requirement 2: High availability in the event of sudden failure> is to minimize the switching time through automatic offload destination switching in conjunction with failure detection and automatic re-input based on the accelerator task processing status. As a result, it is possible to realize automatic processing continuation by automatic task re-offloading in the event of an accelerator failure.

In the signal processing resource switching systems 1000 to 1000C (FIGS. 1 to 4), the offload destination calculation resource determination unit 120 selects an accelerator in which a failure has occurred and a failover destination accelerator serving as a substitute for an accelerator to be switched, sets it in the function proxy execution unit 111, notifies the task re-offload instruction unit 170 of the accelerator in which a failure has occurred and the failover destination accelerator, and instructs the instruction unit to re-input a task.

In this way, it is possible to minimize the switching time by automatic offload destination switching in conjunction with failure detection and automatic re-input based on the accelerator task processing status, and to realize <Requirement 2: High availability in the event of sudden failure>.

The signal processing resource switching systems 1000 to 1000C (FIGS. 1 to 4) further include an accelerator failure prediction unit 130 configured to predict a failure of an accelerator and notify of a switching target accelerator whose failure is predicted, and a task input suppression unit for planned shutdown 140 configured to instruct the task re-offload instruction unit 170 to suppress input of a new task to the switching target accelerator in a case where a notification of the switching target accelerator is received from the accelerator failure prediction unit 130.

In this way, the accelerator failure prediction unit 130 predicts the failure of an accelerator, and for the accelerator to be disconnected, the task input suppression unit for planned shutdown 140 suppresses the task input and switches the offload destination to another calculation resource. This makes it possible to realize <Requirement 3: Continuation of processing upon intentional disconnection>. <Requirement 3: Continuation of processing upon intentional disconnection> is to suppress input of a task to the switching target accelerator and to continue arithmetic operation by switching after confirming that the task is empty. As a result, it is possible to realize uninterruptible switching during intentional disconnection by suppressing the input of the accelerator task.

There are provided signal processing resource switching systems 1000 to 1000C (FIGS. 1 to 4) including a server 250 and a remote-side server 260 connected through a network 2, the server 250 offloading specific processing of an application (application unit 1) to accelerators (accelerators 12-1 and 12-2, accelerator (remote) 12) disposed in the server 250 or the remote-side server 260 to perform arithmetic processing, wherein signal processing resource switching devices 100 to 100C (FIGS. 1 to 4) that switch a calculation resource which is an offload destination are provided within the server 250 or outside the server 250, the signal processing resource switching device 100 includes a function proxy execution unit 111 configured to accept a "function name•argument" from an application and notify the application of argument data of a function when the function is executed or ended by the calculation resource, an accelerator failure detection unit 110 configured to detect a failure of the accelerator, and an offload destination calculation resource determination unit 120 configured to determine an unfailed and available resource among the calculation resources, and the function proxy execution unit 111 performs offloading on the resource determined by the offload destination calculation resource determination unit 120.

Thereby, in the signal processing resource switching systems 1000 to 1000C including the server 250 and the remote-side server 260 connected through the network 2, the offload destination calculation resource determination unit 120 selects an unfailed and available one from among "the accelerators 12-1 and 12-2 mounted on the server, the CPU 11, and the accelerator (remote) 12 of the remote-side server" which are calculation resources, and notifies the function proxy execution unit 111 of the selected one. The function proxy execution unit 111 realizes <Requirement 1: permeability> by automatically performing switching in accordance with the failure detection result.

Figure 17:
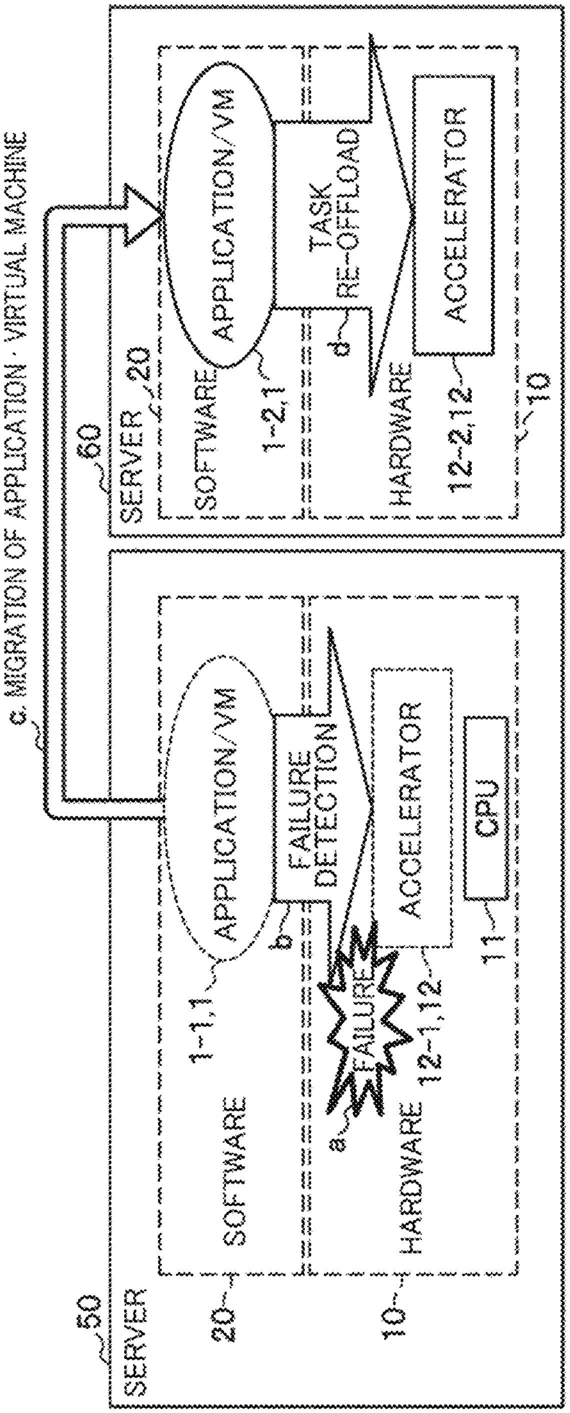
FIG. 17 is a diagram illustrating launching in a separate server in NPL 1.

Particularly, in the past, as shown in FIG. 17, after detecting a failure of hardware, it was necessary to migrate an application/VM using the hardware to another server to continue processing, and the entire application/VM was migrated or restarted up even though the CPU had not failed. On the other hand, in the present embodiment, in the signal processing resource switching systems 1000 to 1000C (FIGS. 1 to 4), it is possible to realize <Requirement 1: permeability> and <Requirement 2: High availability in the event of sudden failure>, and to continue arithmetic processing to the maximum extent possible without instructions from the application when the accelerator is unavailable.

In addition, all or some of the processes described as being performed automatically among the respective processes described in the embodiment and modifications can be performed manually, or all or some of the processes described as being performed manually can be performed automatically using a known method. Furthermore, information including processing procedures, control procedures, specific names, and various types of data and parameters set forth in the description and drawings given above can be arbitrarily changed unless otherwise specified.

In addition, the elements of the devices shown are ideational functions and may not be necessarily configured as physically shown. That is, the specific form of distribution and integration of the respective devices is not limited to the shown form, and all or a part thereof can be configured to be functionally or physically distributed and integrated in any unit in accordance with various loads, usage conditions, and the like.

In addition, the above configurations, functions, processing units, processing means, and the like may be realized by hardware by designing a part or all of them with, for example, an integrated circuit, and the like. Further, the above-mentioned structures, functions, and the like may be realized by software for interpreting and executing programs for realizing the respective functions by the processor. Information such as a program, a table, a file for realizing each function is stored in a recording device such as a memory, a hard disk, a solid state drive (SSD), or a recording medium such as an integrated circuit (IC) card, a secure digital (SD) card, or an optical disc.

The invention claimed is:

1. A signal processing resource switching device having a plurality of accelerators and switching a calculation resource which is an offload destination when specific processing of an application is offloaded to the accelerators to perform arithmetic processing, the device comprising:

a function proxy execution unit configured to accept a function name and argument from an application and notify the application of argument data of a function when the function is executed and ended by the calculation resource;

an accelerator failure detection unit configured to detect a failure of the accelerator;

an offload destination calculation resource determination unit configured to determine an unfailed and available resource among the calculation resources;

a task processing status recording unit configured to receive a task processing status in a time-series manner from the function proxy execution unit and hold an uncompleted arithmetic task in each calculation resource; and a task re-offload instruction unit configured to instruct the function proxy execution unit to re-execute an uncompleted arithmetic task of a switching source calculation resource on the basis of an identifier of the switching source calculation resource accepted from the offload destination calculation resource determination unit, wherein the function proxy execution unit performs offloading on the resource determined by the offload destination calculation resource determination unit.

2. The signal processing resource switching device according to claim 1, wherein the offload destination calculation resource determination unit selects an accelerator in which a failure has occurred and a failover destination accelerator serving as a substitute for an accelerator to be switched, and sets it in the function proxy execution unit, and the determination unit notifies the task re-offload instruction unit of the accelerator in which a failure has occurred and the failover destination accelerator, and instructs the instruction unit to re-input a task.

3. The signal processing resource switching device according to claim 2, further comprising:

an accelerator failure prediction unit configured to predict a failure of an accelerator and notify of a switching target accelerator whose failure is predicted; and a task input suppression unit for planned shutdown configured to instruct the task re-offload instruction unit to suppress input of a new task to the switching target accelerator in a case where a notification of the switching target accelerator is received from the accelerator failure prediction unit.

4. A signal processing resource switching system comprising a server and a remote-side server connected through a network, the server offloading specific processing of an application to an accelerator disposed in the server or the remote-side server to perform arithmetic processing, wherein a signal processing resource switching device that switches a calculation resource which is an offload destination is provided within the server or outside the server, the signal processing resource switching device includes a function proxy execution unit configured to accept a function name and argument from an application and notify the application of argument data of a function when the function is executed and ended by the calculation resource, an accelerator failure detection unit configured to detect a failure of the accelerator, an offload destination calculation resource determination unit configured to determine an unfailed and available resource among the calculation resources, a task processing status recording unit configured to receive a task processing status in a time-series manner from the function proxy execution unit and hold an uncompleted arithmetic task in each calculation resource, and a task re-offload instruction unit configured to instruct the function proxy execution unit to re-execute an uncompleted arithmetic task of a switching source calculation resource on the basis of an identifier of the switching source calculation resource accepted from the offload destination calculation resource determination unit, wherein the function proxy execution unit performs offloading on the resource determined by the offload destination calculation resource determination unit.

5. A signal processing resource switching method of a signal processing resource switching device having a plurality of accelerators and switching a calculation resource which is an offload destination when specific processing of an application is offloaded to the accelerators to perform arithmetic processing, wherein the signal processing resource switching device executes:

a step of accepting a function name and argument from an application, notifying the application of argument data of a function when the function is executed and ended by the calculation resource, and performing offloading on a determined resource;

a step of detecting a failure of the accelerator;

a step of determining an unfailed and available resource among the calculation resources;

a step of receiving a task processing status in a time-series manner and holding an uncompleted arithmetic task in each calculation resource; and a step of instructing to re-execute an uncompleted arithmetic task of a switching source calculation resource on the basis of an identifier of the switching source calculation resource accepted.

* * * * *